US006351324B1

(12) United States Patent
Flint

(10) Patent No.: US 6,351,324 B1
(45) Date of Patent: Feb. 26, 2002

(54) LASER IMAGING SYSTEM WITH PROGRESSIVE MULTI-BEAM SCAN ARCHITECTURE

(75) Inventor: Graham W. Flint, Albuquerque, NM (US)

(73) Assignee: Photera Technologies, Inc.

( * ) Notice: Subject to any disclaimer, the term of this patent is extended or adjusted under 35 U.S.C. 154(b) by 0 days.

(21) Appl. No.: 09/521,296

(22) Filed: Mar. 9, 2000

(51) Int. Cl.[7] .............................................. G02B 26/08
(52) U.S. Cl. ...................... 359/202; 359/201; 359/204; 359/216; 348/210
(58) Field of Search ................................. 359/201, 202, 359/204, 216–219, 900; 348/201–205, 756, 757, 759, 760, 209–210, 758; 347/232, 233, 239, 243

(56) References Cited

U.S. PATENT DOCUMENTS

| 3,507,984 A | 4/1970 | Stavis |
| 3,549,800 A | 12/1970 | Baker et al. |
| 3,571,493 A | 3/1971 | Baker et al. |

(List continued on next page.)

FOREIGN PATENT DOCUMENTS

| DE | 31 37 031 | 4/1982 |
| DE | 43 24 849 | 2/1995 |
| DE | 43 11 112 | 5/1995 |
| DE | 196 32 089 | 2/1997 |
| EP | 488 903 | 6/1992 |
| EP | 696875 | 2/1996 |
| EP | 458 270 | 11/1999 |
| FR | 2 577 371 | 8/1976 |
| FR | 2 371 107 | 11/1976 |
| FR | 2 581780 | 11/1986 |
| GB | 2 252 472 | 8/1995 |
| JP | 56 109314 | 8/1981 |
| WO | WO 92/22109 | 12/1992 |
| WO | WO 94/18802 | 8/1994 |
| WO | WO 95/10159 | 4/1995 |

OTHER PUBLICATIONS

Yamamoto, M. and Taneda, T.; *Laser Displays;* Circa 1975; p. 1–63.

*Primary Examiner*—James Phan
(74) *Attorney, Agent, or Firm*—Law Offices of James D. McFarland

(57) ABSTRACT

A progressive scan architecture for displaying a two-dimensional image by alternately scanning two or more laser beams, one after the other with a time delay between adjacent beams. The beams are arranged to become incident upon a polygon scanner in a row with an approximately uniform spatial separation and an approximately equal angle between adjacent beams. The polygon scanner scans horizontally and a galvanometer-driven mirror scans vertically. Adjacent lines are progressively scanned in sequence from top to bottom, which advantageously reduces or eliminates psycho-visual effects and is tolerant of non-linearities in the vertical scanner, allowing use of a low-cost galvo mirror. Typically, the beams in the row are arranged in pairs, and only one beam from each pair will be scanning at any one time. Embodiments are described in which the duty cycle is slightly less than 50% and the laser illumination is switched between two interleaved beam scans thereby allowing a single modulator to be used for both beams which provides significant cost advantages and improves system efficiency. For full-color images, each of the beams described can incorporate separate red, green and blue (RGB) components which are individually modulated by separate red, green, and blue modulators. The system can be scaled up with one or more additional pairs of beams to improve resolution and/or increase pixel count without requiring a high-speed polygon scanner or a highly-linear galvo scanner. Furthermore, the height of each facet in the polygon mirror need be only one beam diameter and its length need only be two beam diameters, which allows the system to approach the minimum pixel size attainable, which is useful to provide high efficiency and high brightness in the image.

31 Claims, 10 Drawing Sheets

U.S. PATENT DOCUMENTS

| | | |
|---|---|---|
| 3,621,133 A | 11/1971 | Baker et al. |
| 3,636,251 A | 1/1972 | Daly et al. |
| 3,721,756 A | 3/1973 | Baker et al. |
| 3,727,001 A | 4/1973 | Gottlieb |
| 3,737,573 A | 6/1973 | Kessler |
| 3,762,791 A | 10/1973 | Fournier et al. |
| 3,818,129 A | 6/1974 | Yamamoto |
| 3,936,871 A | 2/1976 | Mohon |
| 4,390,235 A | 6/1983 | Minoura |
| 4,470,075 A | 9/1984 | Yoshimoto et al. |
| 4,517,608 A | 5/1985 | Maeda et al. |
| 4,796,961 A | 1/1989 | Yamada et al. |
| 4,851,918 A | 7/1989 | Crowley |
| 4,930,849 A | 6/1990 | Tanaka |
| 5,032,924 A | 7/1991 | Brown et al. |
| 5,140,427 A | 8/1992 | Nakane et al. |
| 5,185,617 A | 2/1993 | Takanashi et al. |
| 5,317,348 A | 5/1994 | Knize |
| 5,424,771 A | 6/1995 | Yu |
| 5,440,352 A | 8/1995 | Deter et al. |
| 5,485,225 A | 1/1996 | Deter et al. |
| 5,610,647 A | 3/1997 | Takada |
| 5,694,180 A | 12/1997 | Deter et al. |
| 5,715,021 A | 2/1998 | Gibeau et al. |
| 5,874,929 A * | 2/1999 | Opower et al. ............. 359/204 |
| 5,990,983 A | 11/1999 | Hargis et al. |
| 6,008,925 A | 12/1999 | Conemac |
| 6,020,937 A * | 2/2000 | Bardmesser ................ 348/756 |

\* cited by examiner

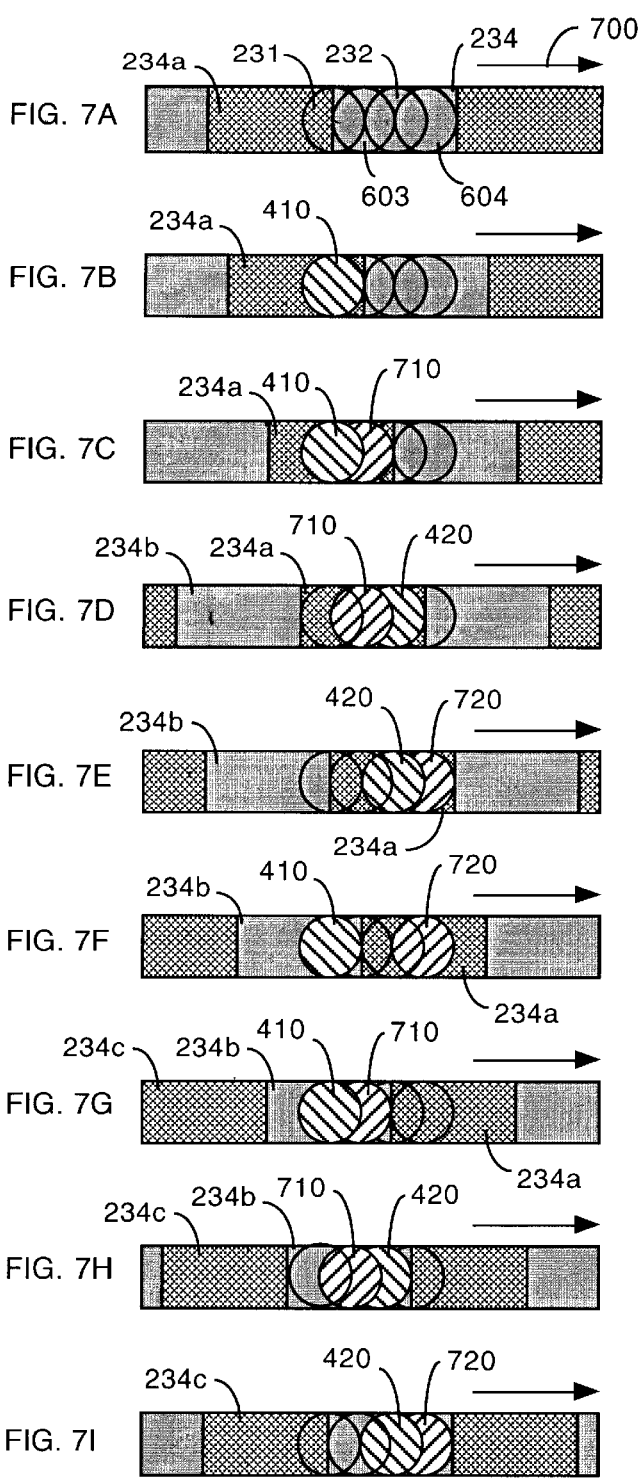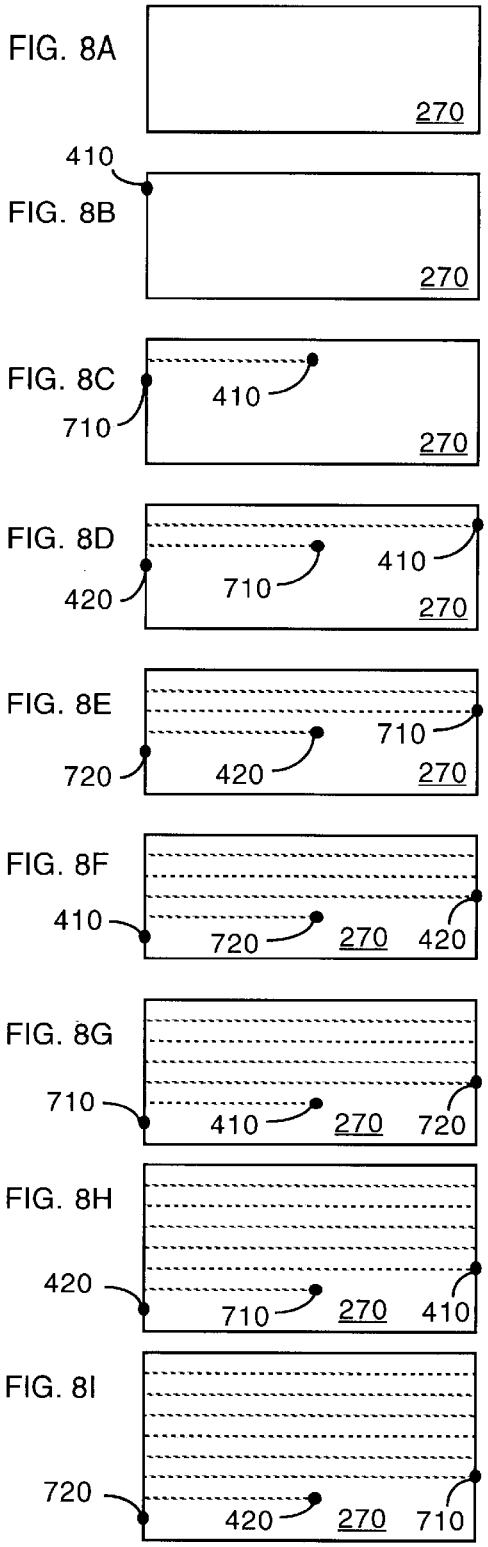

LASER IMAGING SYSTEM WITH PROGRESSIVE MULTI-BEAM SCAN ARCHITECTURE

BACKGROUND OF THE INVENTION

1. Field of the Invention

The present invention generally relates to scanning projection and display systems. More particularly, it relates to projection and display systems that scan one or more modulated laser beams to generate an image.

2. Description of Related Art

Rapid advances in information processing and video production have made it technically possible to provide high resolution video images. However, the quality of the video images seen by a viewer is severely limited by the systems that project the image on a screen. The lack of suitable display systems has been a significant factor in preventing widespread application of high resolution video projectors. Generally, the available projection display systems are either very expensive, or they do not provide a high quality image at high frame rates and high resolution, and with sufficient brightness. If available at an affordable cost, high resolution projection displays would have widespread and diverse uses such as projection TV for consumers and businesses, projectors for meeting room and auditoriums, flight simulators for military uses, and movie projectors for theatres.

Two basic principles, direct emission and light modulation, are commonly used in video projectors. Direct-emission projectors emit their own light. The most common direct emission device is the CRT projector used in home TV projectors. High power versions of CRT projectors have been used for large screen industrial use. In a CRT projector, an electron beam is appropriately modulated to excite phosphors, which in turn generates the color of each pixel in the image that is projected onto a screen.

To display a video (i.e. moving) image, a sequence of frames are displayed very rapidly on the CRT screen. Each frame must be fully scanned by a single electron beam within a very short time period. For example, for a 60 Hz frame refresh rate, each frame must be scanned in less than $\frac{1}{60}$ of a second. Because a frame is defined by a number of adjacent lines, each line must be scanned within a small fraction of the frame period, depending upon the size of the display. For example, in a standard 640×480 pixel format, each of 480 lines must be scanned in less than 3.5 microseconds (i.e. $3.5 \times 10^{-6}$ second). Of course, larger pixel formats (e.g. 800×600 or 2000×1000 have a greater number of pixels and lines, and therefore such larger formats require correspondingly faster line scans.

Despite the large number of lines that are scanned, direct-emission projectors have a relatively straightforward design that conceptually consists of only a controllable light source and optics. The evolution of the CRT projector to its present state illustrates how, owing to its inherent simplicity, a direct-emission display mechanism can be readily produced and later scaled-up to higher brightness and resolution levels. However, as resolution and brightness requirements increase, CRT-based projectors reach some physical limits and therefore, other ways to project video and computer information have been proposed and developed.

Light-modulation projectors have been proposed in which red, green, and blues lasers are individually modulated and combined to generate a full color image on a projection screen. In light-modulation projectors, laser radiation is modulated in a modulator array that switches individual display elements (pixels) on or off. Liquid crystal display (LCD) panels are common light modulators. Other modulators, such as acousto-optic modulators, oil film modulators, and deformable micro-mirrors (DMDs), are also available.

Light modulation projectors can be classified depending upon whether the modulated beam is scanned or not. Generally, a non-scanning projector requires a two-dimensional modulator array large enough to have a one-to-one relationship with the screen pixels, and each pixel is constantly illuminated. For example each array pixel in a 640×480 DMD array is directly mapped onto a screen pixel. However, non-scanning systems have demanding electronics requirements due to the large number of pixels that must be accessed simultaneously, and the available modulators are difficult and expensive to scale up to such sizes. Unfortunately, in the context of large high resolution displays, the available two-dimensional modulators have a limited pixel count. As a point of reference, present-day full-color LCD-based and DMD-based display systems are limited to pixel counts of less than $10^6$, while some displays require pixel counts of $2 \times 10^6$ and greater. Furthermore, the brightness of the projected display in constant illumination systems is low at higher pixel counts because the fractional area of the pixels decreases at higher densities, thereby reducing light output. The design issues associated with such constant illumination systems are difficult and complex, and in many cases they directly limit the achievable results.

In order to overcome the limitations and problems inherent in non-scanning projection systems that constantly illuminate each pixel, scanning architectures have been developed in which multiple laser beams are very rapidly scanned across a screen to create an image. The concept of scanning a single modulated laser beam is similar to the concept of scanning an electron beam in the familiar CRT monitor widely used for computers and TVs. However, a practical system for scanning an electron beam is very different from a practical system for scanning a modulated laser beam. Laser scanning configurations have practical hardware limitations on the modulation rate and the scanning rate. Particularly, the available light modulators are limited in bandwidth. Further bandwidth limitations are imposed by the scanner and scanning configuration. A typical two-dimensional (2D) scanner uses a polygon scanner for horizontal scanning and a galvanometer-actuated mirror (a "galvo mirror") for vertical scanning, both of which have limited bandwidth (i.e. scanning rate). Although some high bandwidth polygon scanners are available, they are very expensive and impractical. Galvo mirrors are much less expensive, but they have much smaller bandwidth, and are plagued with nonlinearities.

To address the limitations of scanning speed and modulation bandwidth, parallel scanning systems have been proposed in which multiple modulated laser beams are scanned simultaneously, thereby reducing the scanning speed and modulation bandwidth requirements, such as disclosed in U.S. Pat. No. 5,534,950 issued Jul. 9, 1996 and PCT publication WO95/10159, published Apr. 13, 1995.

Parallel scanning techniques (architectures) used in prior multi-beam laser display systems can be divided into three basic techniques for purpose of discussion. These three scanning architectures are termed herein: (1) vernier, (2) paintbrush, and (3) pushbroom. In these scanning architectures, the image space can be treated as being divided into bands, which are defined as groups of adjacent lines. Typically, the number of lines in each band is equal throughout the image space, for example one parallel scanning system for a 640×480 format has 48 bands, each band including ten lines.

In the vernier scan architecture, multiple modulated laser beams simultaneously write multiple bands. Each band is written by a laser beam that is scanned across the screen to write a first line, then deflected to a next line in the band, then scanned to write the next line, and so forth until all the lines in the band have been written. Multiple beams are used to scan multiple bands in parallel; for example, one system may include 64 modulated laser beams that are vertically arranged with a spacing between adjacent beams of about $\frac{1}{64}$ of the screen height. The 64 beams write 64 bands in parallel in the image space.

In the paintbrush scan architecture, the laser beams are closely aligned in a vertical arrangement so that all lines in one band are written simultaneously. For example if a band has 64 lines, then 64 closely-positioned laser beams are utilized to scan each band. If the image has 640 lines, then a frame in an image is written by scanning ten bands in sequence, one after the other.

The pushbroom scan architecture is a variation of the paintbrush system in which the number of laser beams is equal to the number of lines in the image space. For example, a pushbroom system for a 1000 line image requires 1000 laser beams, which reduces the bandwidth requirements of the modulators at the cost of a need for additional modulators. One advantage of the pushbroom system is that a frame is displayed in the time it takes to write one line due to the parallel writing of each line in the image.

A significant challenge in implementing laser scanning systems relates to achieving a clear, high quality image with high resolution while avoiding psycho-visual artifacts of laser scanning such as latency, image doubling, and image breakup. Particularly, in the context of producing moving images, it is important to reduce scan-related artifacts that affect the image. One problem with laser scanning systems relates to the differential in refresh time between adjacent or neighboring pixels. If objects traverse the image at high angular rates, each pixel of the image must be refreshed at a time instant very close to the refreshment time of all neighboring pixels. In non-interlaced CRT-based systems which raster scan each line sequentially, the maximum time between writing adjacent pixels on adjacent lines is small enough that even a quickly traversing object is unlikely to have moved by as much as a single pixel. For example, in a 1024-line non-interlaced format with a 60 Hz refresh rate, the maximum time delay between writing adjacent pixels is 15 microseconds.

However, the laser-based vernier scan architecture discussed previously suffers from severe artifacts relating to the large differential refresh time between neighboring pixels. Particularly, the last line in the first band is written by the first beam at the end of a frame, while the first line in the second band is written by the second beam at the beginning of the same frame. As a consequence, adjacent pixels in the last line of the first band and the first line of the second band are refreshed with an unacceptably large time differential. For example, in the 1024-line non-interlaced format with a 60 Hz refresh rate discussed previously, the time delay between writing adjacent pixels can be up to about 16 milliseconds, which is approximately 1000 times greater than that associated with a non-interlaced CRT raster scan. During this much longer interval, a fast-traversing object may be displaced by many pixels. This circumstance can cause the psycho-visual system of the viewer to observe both image doubling and image breakup, the severity of which depends upon the transverse velocity of the object being viewed and upon the instantaneous location of that object relative to the boundaries that lie between regions of the image that are written by different beams.

The paintbrush scan architecture, in which each band is written in sequence by closely-positioned beams, can reduce the time differential between writing adjacent pixels and accordingly reduce artifacts. Specifically, in the paintbrush architecture the time differential is equal to the time between writing adjacent bands. For example, in the 1024-line non-interlaced format with a 60 Hz refresh rate discussed above, the maximum time delay between writing adjacent pixels would be about 1.0 millisecond, a delay short enough to eliminate some of the effects of psychovisually-induced image artifacts. Unfortunately, implementation of the paintbrush architecture poses severe problems. First, it has proven very difficult to balance the relative brightness of closely-positioned beams in a manner consistent with the elimination of horizontal banding. Furthermore, it has been found that the geometric interfaces between adjacent bands must be matched with high accuracy, which in turn requires extreme precision in both the rate and the linearity of the vertical scanning mechanism. Such an extremely precise scanning mechanism is not presently available.

In a pushbroom architecture, the entire frame is scanned in parallel, and therefore the maximum time delay between adjacent pixels corresponds to the interval required for a column of beamlets to move horizontally by one pixel, which can be very short. Accordingly psycho-visual artifacts are negligible in the pushbroom approach. Unfortunately, implementation of the pushbroom approach requires linear array modulators with thousands of individual elements, none of which are commercially available at the present time. Furthermore, the closely-spaced beams pose the same problem as in the paintbrush approach; particularly it is very difficult to balance the relative brightness between lines, thereby eliminating horizontal banding.

SUMMARY OF THE INVENTION

In order to overcome the limitations of the prior art, the present invention provides a progressive scan architecture that can display a high-resolution video image. A two-dimensional image, defined by data arranged in a plurality of rows corresponding to a plurality of lines in the image, is progressively scanned in a system in which at least two beams are scanned alternately, one after the other. Adjacent lines can be scanned in sequence from top to bottom, which advantageously reduces or eliminates psycho-visual effects such as image doubling, breakup problems, and reduces or eliminates latency problems. Furthermore, the top-to-bottom progressive scan architecture is tolerant of non-linearities in the vertical scanner; a feature that permits the use of a low-cost galvanometer while avoiding horizontal banding in the displayed image. High resolution and/or high pixel counts can be achieved by adding beams in a straight forward manner, without requiring a high-speed polygon scanner or a highly linear galvo scanner.

A method for progressively scanning a plurality of laser beams to generate a two-dimensional image includes alternately scanning a first and a second laser beam along a first axis of said two-dimensional image (typically the horizontal axis), and scanning the laser beams at an approximately constant rate along a second axis substantially perpendicular to said first axis (typically the vertical axis). In some embodiments, the progressive scanning method further comprises alternately scanning one or more additional pairs of laser beams with the first and second laser beams. One progressive scanning method includes rotating a polygon mirror arranged to receive the first laser beam along a first optical path and the second laser beam along a second optical path non-parallel to the first optical path. The first and second laser beams define a row along a perimeter of the polygon mirror. Some methods include generating a beam of laser radiation, modulating the beam, and switching (i.e. alternating) the modulated beam between a first and second optical path so that the modulated beam provides the first beam when switched to the first optical path and provides the second beam when switched to the second optical path.

In a system described herein a polygon scanner scans at least two modulated laser beams horizontally and a galvanometer (galvo) mirror scans the beams vertically. The beam spots (the "incident locations") on the polygon scanner are arranged in a row aligned with the perimeter of the polygon. The beams in the row are arranged in pairs, and typically only one beam from each pair will be scanning at any one time. In such an embodiment, where the duty cycle is slightly less than 50%, the laser illumination can be switched between two interleaved beam scans, thereby allowing a single modulator to be used for both beams, which can provide significant cost advantages and improve system efficiency without requiring a long polygon facet. Additional pairs of beams can be added as described herein to improve resolution and/or increase pixel count without requiring a high-speed polygon scanner or a highly-linear galvo scanner. For example, increasing the number of pairs from one to two can be used to double the resolution or to provide a two-fold reduction in polygon rotational speed. Accordingly, a low-cost polygon scanning mirror, with a small diameter and a small facet length well within the limits of available technology, can be utilized. For example, the height of each facet need be only one beam diameter and its length need only be two beam diameters, which provides significant cost advantages.

A method described herein for progressively scanning a pair of modulated laser beams includes modulating a laser beam with a first row of image data, propagating the modulated laser beam along a first optical path, and scanning the first modulated laser beam to display a first image line during a first time interval that begins at a first time. During a second time interval that begins at a second time delayed from the first time by a uniform time interval, a second laser beam is modulated with a second row of image data, the modulated laser beam is propagated along a second optical path that is displaced from the first optical path, but substantially in the same plane, and then scanned to display a second image line during a second time interval. In subsequent time intervals, each subsequent row of image data is displayed by alternating the first and second laser beams, thereby displaying the lines in the image. Each subsequent line scanning operation begins at a time delayed from the beginning of the preceding line's scanning operation by the uniform time interval.

A progressive scanning system for scanning the pair of modulated laser beams includes a polygon scanner for scanning the lines of the image along a first axis (typically the horizontal axis) and a scanning mirror for scanning along a second axis (typically the vertical axis). The polygon scanner has a perimeter and a plurality of reflective facets are formed on the perimeter, each of the facets having an approximately equal length. During operation, the polygon scanner rotates about its central axis to sequentially present the reflective facets to a row of modulated laser beams. Particularly, a first optical system directs the first modulated laser beam along a first optical path to a first incident location on the perimeter of the polygon scanner, and a second optical system directs a second modulated laser beam along a second optical path to a second incident location on the perimeter of the polygon scanner, the second incident location being spaced apart from the first incident location. The second optical path is arranged non-parallel to the first optical path so that the second laser beam propagates non-parallel to the first laser beam, although the first and second optical paths may lie in the same plane (i.e., substantially uniplanar but non-parallel). The scanning mirror is arranged to receive the first and second beams from the polygon scanner. The scanning mirror includes a motive system to scan the first and second beams at an approximately constant rate along a second axis approximately perpendicular to the first axis, such that the first modulated laser beam scans a first line in the image and the second modulated laser beam scans a second line delayed from the first line.

In some embodiments two light modulators are used, one for each beam. In one such embodiment a primary laser beam is split by a beamsplitter into a pair of beams having approximately equal powers, and a first beam is modulated by a first light modulator during the first time interval to provide the first modulated laser beam and the second laser beam is modulated by a second light modulator during the second time interval to provide the second modulated laser beam.

In other embodiments a single light modulator is used to modulate the primary laser beam, and an optical switch is used to switch the modulated beam between the first and the second optical paths to provide the first and second laser beams. Particularly, the primary laser beam is modulated by the modulator during a first time interval and scanned to display a first image line, then switched from the first optical path to the second optical path, then modulated during the second time interval and scanned to display the second image line, and then switched from the second optical path to the first optical path after the second time interval to repeat the operations for all lines in the image. Advantageously, such an arrangement reduces by a factor of two the number of high-cost modulators required at the cost of an additional switch. Furthermore, such a system efficiently uses the energy of the primary laser beam.

The progressive scanning system easily can be expanded by addition of one or more pairs of beams that progressively scan the image in concert with the first pair. Generally, additional pairs are added so that the total number of pairs is a power of two; i.e. one pair, two pairs, four pair, eight pairs, and so forth. The spatial separation between the two beams in each additional pair is approximately equal to the spatial separation of the first pair. The first beam of each succeeding pair typically is situated midway between the first and second beams of another pair, and the propagation angle between each adjacent beam is approximately equal, while lying substantially within a single plane. For example, a second pair is arranged with the first pair in a row in which the first beam of the second pair is situated midway between the first and second beams of the first pair. Each incident location is separated by an approximately equal distance from the adjacent incident locations. Furthermore, the propagation of the four beams are non-parallel to each other, having propagation angles between adjacent beams that is approximately uniform, although the four beam paths may lie in a single plane (substantially uniplanar but non-parallel within that plane). In an example with four pairs, a third and fourth pair are arranged so that the first beam of the third pair is situated between the first beams of the first and second pair, and the first beam of the fourth pair is situated between the first beam of the second pair and the second beam of the first pair.

Typically, the first and second incident locations have a center-to-center distance of approximately one-half of the polygon facet length.

In some embodiments, a full-color image can be displayed by the progressive scanning system described herein. For full-color images, each of the beams described can incorporate separate red, green and blue (RGB) components which are individually modulated by separate red, green, and blue modulators. In one such embodiment, the first modulated laser beam comprises a first RGB combined laser beam, and the second modulated laser beam comprises a second RGB combined laser beam that are progressively scanned as described herein. Additional RGB beams can be added as described herein to increase resolution and/or reduce polygon rotational speed.

BRIEF DESCRIPTION OF THE DRAWINGS

For a more complete understanding of this invention, reference is now made to the following detailed description of the embodiments as illustrated in the accompanying drawing, wherein:

FIGS. 7A, 7B, 7C, 7D, 7E, 7F, 7G, 7H and 7I show a sequence of the four modulated laser beams of FIG. 6 incident upon the facets of a rotational polygon;

FIGS. 8A, 8B, 8C, 8D, 8E, 8F, 8G, 8H, and 8I show a scanning sequence of four modulated laser beams projected on a screen;

DETAILED DESCRIPTION

This invention is described in the following description with reference to the Figures, in which like numbers represent the same or similar elements.

Definitions

A laser is a device that produces a highly directed beam of concentrated optical radiation at a single wavelength. For purpose of this description, optical radiation includes visible wavelengths, infrared wavelengths, and ultraviolet wavelengths.

Video images are created by sequentially displaying a series of frames to create the appearance of motion. The frames are displayed quicker than the persistence of the human eye, and accordingly the time period between frames must be small. A frame refresh rate of at least 60 Hz is acceptable for normal video images, but for high quality and/or high-speed video images, a higher frame refresh rate such as 75 Hz or more is desirable. Typically a frame includes a large number of small pixels (image elements) arranged in a rectangular grid. To display a frame, line-scanning systems very rapidly scan each line in the frame. For example a 640×480 frame has 480 lines, each line having 640 pixels, and all 307,200 pixels must be refreshed during each frame period. The refresh rate establishes how many times the frame must be written in one second, for example a 60 Hz refresh rate requires the entire frame to be written sixty times each second, in other words, an entire frame must complete scanning within a period of less than $\frac{1}{60}$ of a second. In a standard CRT, a single electron beam scans the entire image, which requires that scanning each line be completed within a small fraction of the frame period. For example, in a standard 640×480 format, each of 480 lines are scanned in a period less than 3.5 microseconds (i.e. $3.5 \times 10^{-6}$ second). Larger formats that have a greater number of lines (e.g. 800×600, 2000×1000) require correspondingly faster line scans.

In the case of a laser-based optical imaging system, a 2D (two-dimensional) scanning configuration includes a first scanner that scans along a first axis defined on the screen and a second scanner that scans a second axis approximately orthogonal to the first axis. For purposes of illustration and clarity, the first axis will be termed the "horizontal axis" and the second axis will be termed the "vertical axis". This terminology follows conventional usage.

Overview

Figure 1:
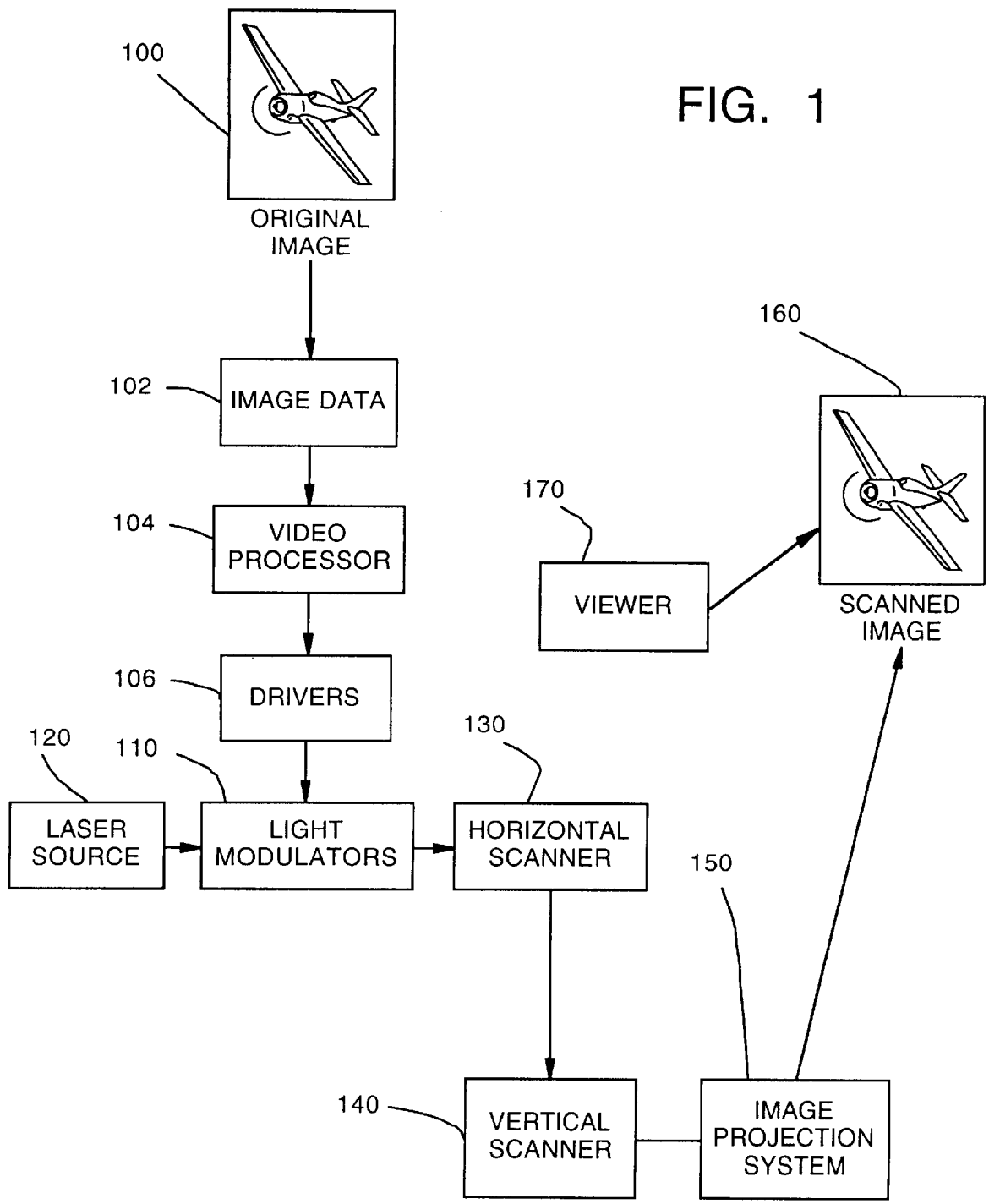
FIG. 1 is a block diagram of a laser scanning projection system that includes a two-dimensional scanning system.

FIG. 1 is a block diagram view of a 2D laser scanning projection system for displaying an image 100 represented by image data 102. The image data, which can be in any suitable format, is supplied to a video processor 104. The video processor receives the image data and processes it into a video signal having a format suitable for the particular projection system implemented in any specific embodiment. The video signal is supplied to one or more drivers 106 that drive corresponding light modulator(s) 110. The light modulators comprise any suitable modulator such as an acousto-optic (AO) modulator, an electro-optic modulator, or a liquid crystal display (LCD). Optical radiation is supplied to the light modulators 110 by a suitable laser source 120. Particularly, the laser source supplies one or more substantially collimated laser beams to the light modulators 110, which modulate the optical radiation in response to the video signal. Conventional optics are used to couple the laser beams into and out of the modulators.

Generally, any type of laser source that provides the desired wavelength (color) and intensity can be used, and the term "lasers" as used herein generally encompasses any suitable laser source. Recent advances in diode laser-pumped solid-state lasers have made possible compact, efficient, visible, coherent microlaser sources, and their small size, low weight, and relatively low cost render them particularly useful for projection systems. Typical microlasers use well-developed near-IR diode laser technology as a pump source for a rare-earth ion doped solid-state laser medium, and convert the near-IR radiation to coherent, narrow band, visible light. Alternatively, visible heterostructure diode lasers are also amenable to the disclosed display configuration. Other lasers, such as gas lasers for example, could also be used.

In some embodiments the laser source 120 provides a single wavelength, but in other embodiments multiple lasers could be used to provide multiple wavelengths. As is well known, the visible wavelengths are divided into colors that correspond to human visual response. In projection displays, a full-color image can be obtained by combining modulated optical radiation from red, green, and blue lasers. Thus, a red/green/blue (RGB) laser system, consisting of three lasers or three laser arrays, each operating at a fundamental color, can be used to create an efficient, high brightness, white light projection source, such as disclosed with reference to FIGS. 10 and 11 for example. In other embodiments, other wavelengths can be used, for example, infrared or ultraviolet wavelengths may be useful for applications such as scene generators for testing military systems.

Figure 2:
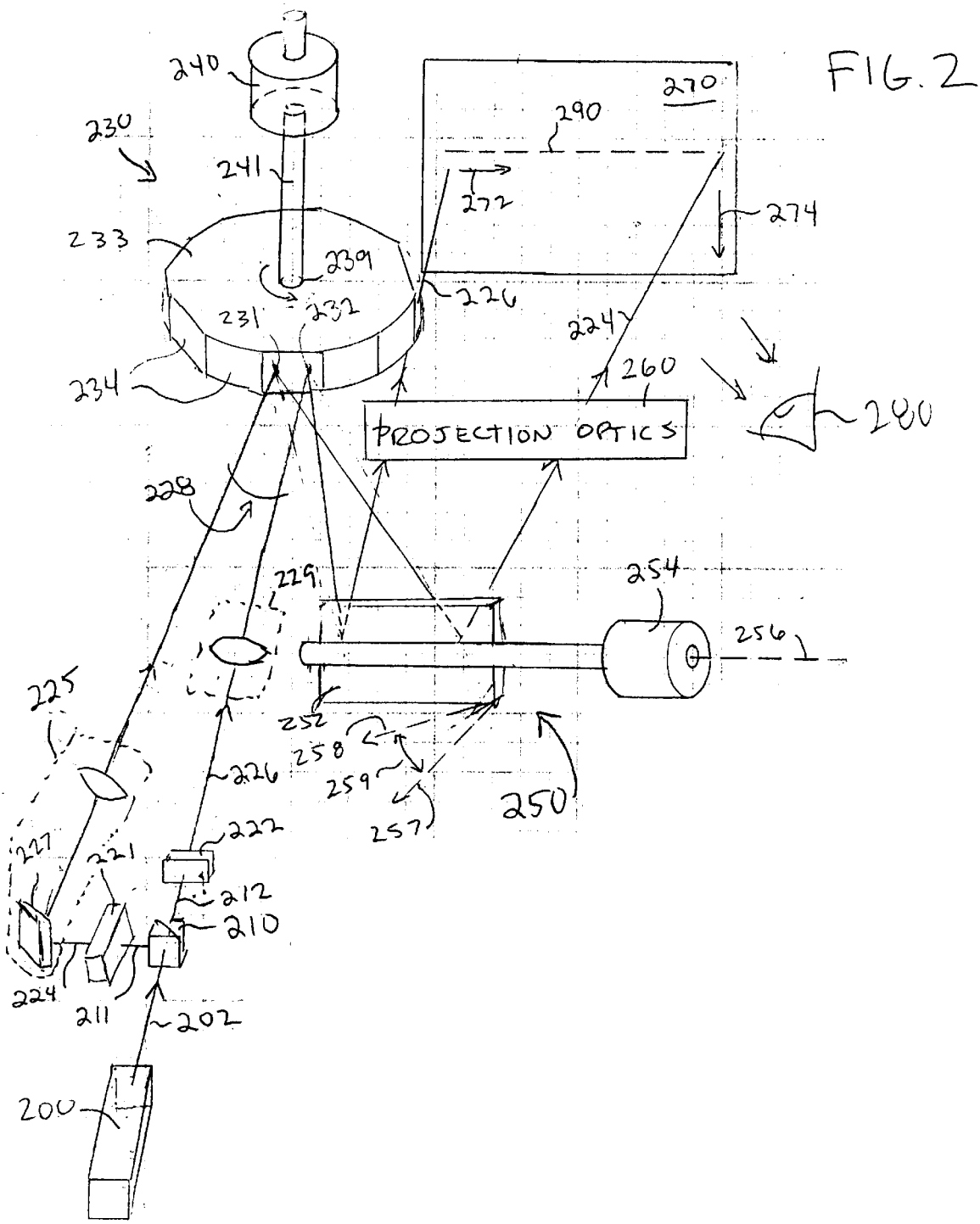
FIG. 2 is a perspective view of an embodiment of a progressive scanning display system that progressively scans two modulated beams, including a polygon mirror that horizontally scans the two beams and a galvo mirror that vertically scans the two beams.
Figure 9:
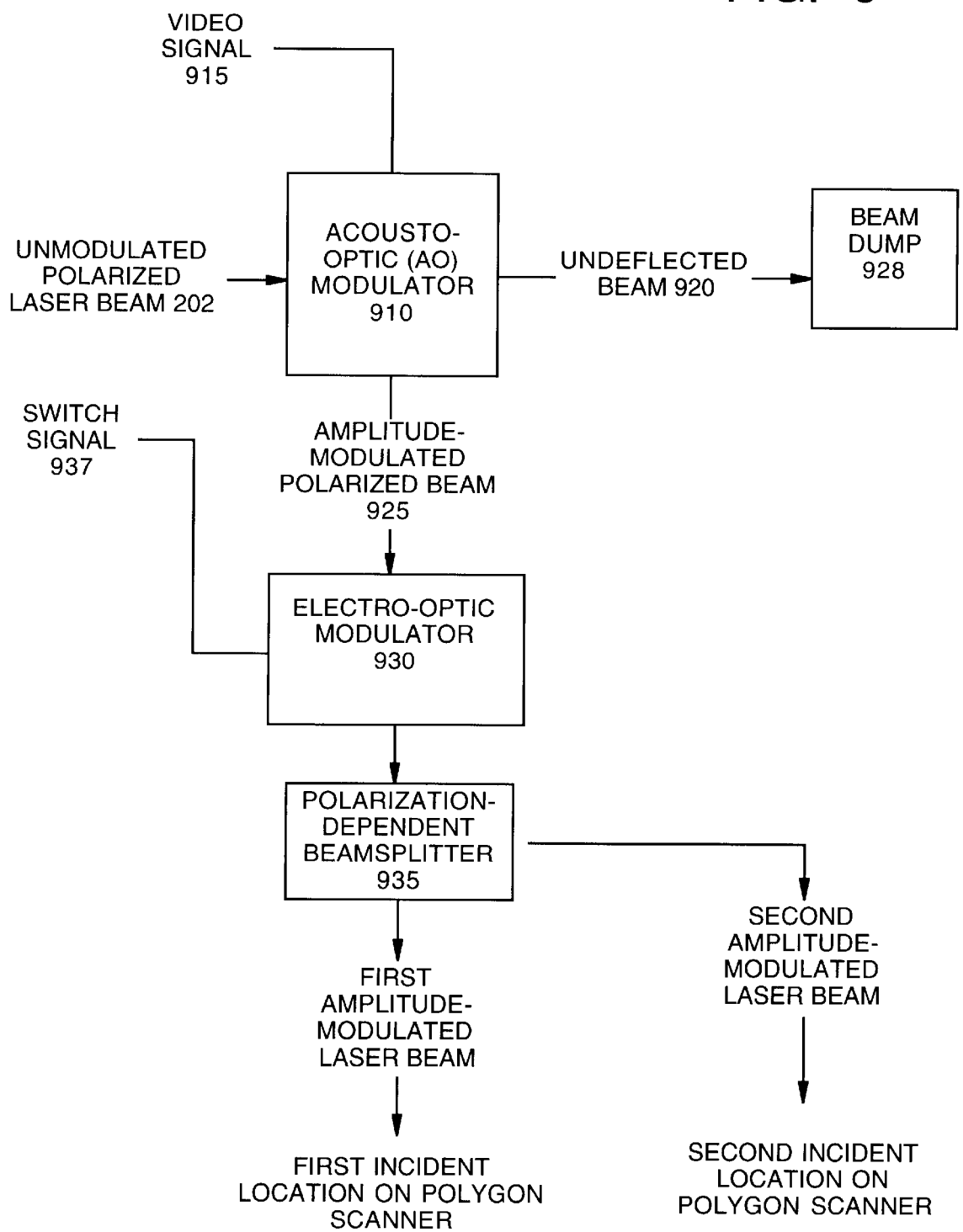
FIG. 9 is a block diagram of an acousto-optic (AO) modulator and an electro-optic modulator switch in a configuration that provides a first modulated beam along a first optical path and a second modulated beam along a second optical path.

The modulated laser output from the light modulators 110 is scanned by a 2D scanning system that includes a horizontal scanner 130 and a vertical scanner 140. At least two optical paths are provided from the light modulators to the 2D scanning system, each of the optical paths being incident upon the horizontal scanner separated by a predetermined distance. The two optical paths can be implemented in many different configurations. For example, FIG. 2 shows an embodiment in which two modulators individually modulate the first and second laser beams that provide the two optical paths. In an alternative embodiment, FIG. 9 shows a single modulated laser beam switched between two optical paths. In other embodiments, additional pairs of modulated laser beams can be added to the system to improve performance as described for example with reference to FIGS. 6, 7A–7I, and 8A–8I.

As described herein for example with reference to FIG. 2, the horizontal scanner 130 includes a polygon mirror that has a plurality of reflective facets formed around its perimeter to scan the modulated laser output in the horizontal direction, and the vertical scanner 140 includes a galvanometer-driven mirror (termed a "galvo mirror") to vertically scan the horizontally-scanned laser output. A galvanometer is a servo-actuated limited-rotation motor typically used together with a mirror for laser or optical beam scanning.

The horizontally- and vertically-scanned laser output from the horizontal and vertical scanners is imaged by a suitable image projection system 150, which generates a two-dimensional scanned image 160 for viewing by a viewer 170. For example, the image projection system may include suitable optics that project the scanned image onto a screen, which can then be viewed by a viewer. Alternately, the image projection system may create an image by other techniques suitable for viewing by a viewer. In summary, the video processor supplies image signals to the drivers, which responsive thereto drive the modulators to provide the modulated laser beams that are scanned to generate the image.

The description herein of the 2D scanning system follows conventional terminology in which the polygon scanner scans the modulated laser beam along a "horizontal" axis while the galvo mirror scans the modulated laser beam along an orthogonal, "vertical" axis. In more general terms, the horizontal and vertical axes include any two approximately orthogonal axes. As used herein the terms horizontal and vertical are utilized herein for purposes of clarity in understanding, and do not limit the scanning system to any particular configuration.

The image projection system comprises any suitable optical system for presenting an image to a viewer. One typical example is a series of lenses that are designed to enlarge an image and project it on a screen.

FIG. 2 is a perspective view of one embodiment of a progressive scanning display system that can create a single-color (monochrome) image. A visible laser 200, such as a diode-pumped, frequency-doubled solid state laser supplies optical radiation in the form of a primary laser beam 202 with a predetermined visible wavelength (color), such as red, green or blue. The optical radiation 202 from the visible laser 200 is divided by a suitable beamsplitter 210, such as a beamsplitter cube that comprises two right-angled prisms cemented together at their hypotenuse faces, with one of the faces including a metallic or dielectric layer having reflective properties that splits the single beam into two beams of approximately equal power. The beamsplitter divides the primary laser beam into a first beam 211 and a second beam 212 having approximately equal power. In alternative embodiments, instead of the single laser 200 and beamsplitter 210, a first and a second laser having approximately equal wavelengths could be used.

The first and second beams 211 and 212 are modulated respectively by a first modulator 221 and a second modulator 222 to generate a first modulated beam 224 and a second modulated beam 226. The first modulated beam is provided to a first optical system 225 that includes a lens, a mirror 227, and any other appropriate optical elements to define a first optical path to a polygon scanner 230. The first optical path defines a first incident location 231 on the perimeter of the polygon scanner for the first modulated laser beam. The second modulated beam propagates through a second optical system 229 that includes a lens and any other appropriate optical elements to define a second optical path to a second incident location 232 on the perimeter of the scanner, spatially separated from the first incident location and arranged in a row along the perimeter. Typically, the first and second beams propagate along non-parallel paths to their respective incident locations; in other words, a non-zero angle, shown at 228, exists between the first and second optical paths.

The non-parallel arrangement of the first and second optical path is designed to provide the desired instantaneous angular separation between the first and second beams in the image. Because of this angular separation, the first and second beams also diverge with respect to each other after reflection from the singular facet. The mirror 227 is positioned and angled to provide the desired spatial separation on the facet and non-zero propagation angles between the two beams.

In some embodiments (not shown in FIG. 2) another optical element may be inserted into the first or second optical systems to adjust the optical paths of the first and second beams to provide the desired angular separation. For example in such embodiments, the first and second beams initially may be approximately parallel and then angularly separated by an optical element that has two angled faces. The polygon scanner horizontally scans the first and second modulated laser beams and the non-zero angle 228 is chosen to provide the appropriate phase delay between the two beams, which typically is approximately equal to one complete screen line of the image.

Figure 3:
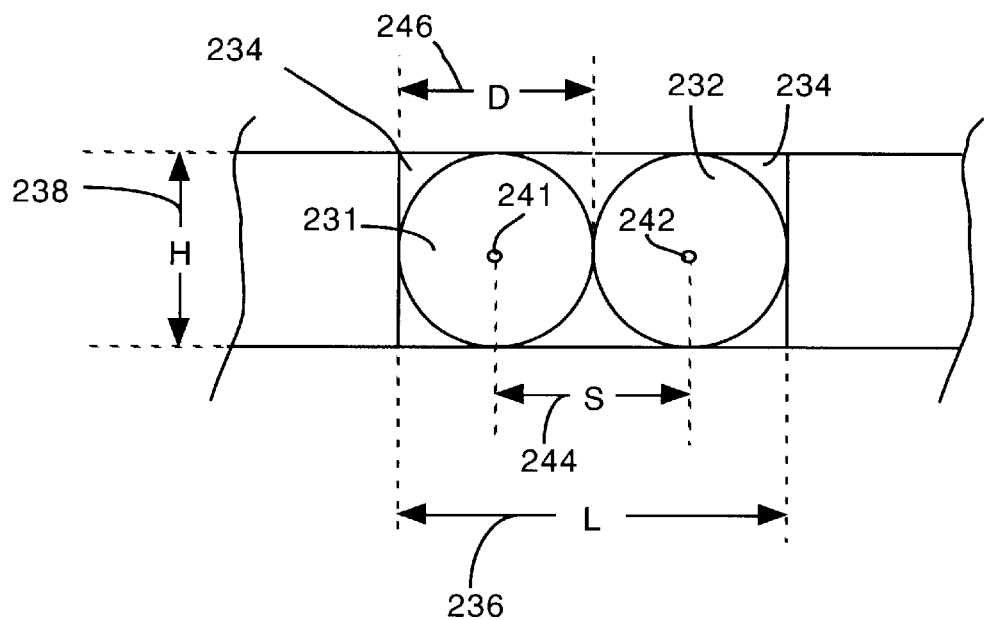
FIG. 3 is a plan view of several facets on the perimeter of the polygon mirror, showing two modulated laser beams situated on those facets.

Reference is now made to FIG. 3 together with FIG. 2. The polygon scanner 230 includes a polygon mirror 233, which is a rotating disk-shaped component having a perimeter that includes a series of approximately flat reflective facets 234, each having an approximately equal length L shown at 236 (FIG. 3) and height H shown at 238. The polygon mirror has a central axis 239, and a suitable rotating mechanism 240, such as a motor is connected via an axle 241 to the central axis. The motor provides accurate angular rotation about the center 239 at a predetermined speed determined by system requirements, such as 25,000 rpm. In operation, as the polygon mirror spins rapidly, it presents a moving perimeter of facets that scan the incident laser beams along the horizontal axis at the required rate.

As briefly discussed above, the first and second modulated laser beams follow first and second paths to the polygon mirror, where they become incident upon the perimeter at first and second incident locations 231 and 232. The centers of the incident locations, including a first center 241 and a second center 242 are separated by a predetermined distance S, shown at 244. Each of the beams has an approximately equal beam diameter D shown at 246. The beam diameter D and the separation distance S have a predetermined relationship with the facets of the polygon mirror; particularly the beam diameter D is approximately equal to the height H of the facet (i.e. D≈H), and the beam separation is approximately equal to one-half of the facet length L (i.e. S≈L/2). The beam diameter as defined herein describes boundaries of the beam in any suitable beam format. Although it may be desirable that the beam have an approximately uniform intensity across its diameter that drops to zero intensity at its boundaries, practical laser beams typically do not have such an ideal configuration. For example, in some embodiments the boundaries may be defined by the FWHM (full width half maximum) of the beam.

Returning to FIG. 2, the first and second modulated laser beams are reflected from the polygon mirror and directed to a galvo scanner 250 that provides vertical scanning. The galvo scanner 250 includes an approximately rectangular galvo mirror 252 and a suitable motive system such as a galvanometer mechanism 254 to controllably rotate the mirror 252 a fixed angular rotation about an axis 256. The galvo mirror 252 has a surface configuration suitable for the optical system in which it used, for example approximately flat or slightly concave. For optimum performance, the galvo mirror should be small and lightweight. In operation, the galvanometer positions the galvo mirror at a start angle 257 and then continuously rotates the mirror at a controlled rate until it reaches a stop angle 258, thereby traversing an angle 259 and then quickly returns the mirror to the start angle. The angular rotation 259 between the start and stop angles is sufficient to complete one vertical scan; i.e., when the angular rotation is complete, an entire frame has been scanned. Accordingly, horizontal scanning occurs much more rapidly than vertical scanning. Particularly, while each facet of the rapidly rotating polygon scanner scans one line, the galvo mirror moves only a small fraction of its limited angular rotation.

The horizontally- and vertically-scanned beams from the galvo scanner 250 are projected by projection optics 260 onto a screen 270 suitable for viewing by a viewer 280. The projection optics 260 include any suitable lenses and/or other optical elements that create the image viewable by the viewer. The direction of horizontal scanning is represented by an arrow 272 and the direction of vertical scanning is represented by an arrow 274. As illustrated in FIG. 2, the first modulated beam 224 is finishing one horizontal scan along a line 290, while the second modulated beam 226 is beginning to horizontally scan along an adjacent line immediately below. The horizontal scan component across the screen is provided by the rapidly spinning polygon mirror 233, while the relatively small vertical scan component is provided by the galvo scanner 250.

The embodiment disclosed in FIG. 2 illustrates a single pair of modulated laser beams that can be used to create a single color (monochrome) display. In other embodiments, such as disclosed with reference to FIGS. 10 and 11, one or more additional pairs of modulated laser beams could be combined with the first pair to generate a multi-color display. For example a full color display could be generated by combining a pair of red laser beams, a pair of green laser beams, and a pair of blue laser beams in combination with appropriate modulators. Furthermore, as described elsewhere with respect to FIGS. 6, 7A–7I, and 8A–8I, additional pairs of beams could be used to generate higher resolution and/or reduce the bandwidth requirements of the modulators and scanners. Note that the angles of incidence of these beams relative to the polygon are arranged so as to be consistent with an appropriate horizontal separation at the viewing screen. In a geometry of the type shown in FIG. 2, the angle between the beams is set approximately equal to half of the angle that corresponds to the scan of a horizontal line measured from edge to edge at the viewing screen.

Reference is now made to FIGS. 4A–4I, which are a series of plan views of several facets of a rotating polygon scanner, showing the incident locations corresponding to a single pair of modulated laser beams as the polygon scanner rotates. Particularly, in each of the FIGS. 4A–4I, the first incident location 231 is shown for a first beam 410 and the second incident location 232 is shown for a second beam 420. The first and second incident locations remain at a fixed location while the facets move in the direction shown by an arrow 400 due to rotation of the polygon. The progression in FIG. 4A–4I is chosen so that each subsequent figure is separated by a fixed, approximately uniform time interval from the previous one; in other words, each subsequent figure shows the position of the facets with respect to the optical path at a next time interval. In FIGS. 4A–4I, if the incident location is actively being written on the screen, then the active location is shown as a lightly dotted area; however if an incident location is not being written, then it is shown in the outline of a circle. For illustration purposes, it is assumed that a beam becomes inactive at the instant wherein a horizontal scan is just complete.

Reference is also made to FIGS. 5A–5I in conjunction with FIGS. 4A–4I. FIGS. 5A–5I directly correspond to FIGS. 4A–4I; for example, FIG. 4A relates directly to FIG. 5A, and so forth. FIGS. 5A–5I show a portion of the screen and the beam's position provided by the configuration shown in the corresponding diagrams of FIGS. 4A–4I. In FIGS. 5A–5I, lines that have been scanned on the screen are indicated by dotted lines. Although FIGS. 4A–4I and 5A–5I do not show the vertical scanner, it should be apparent that the vertical scanner is scanning vertically while the polygon scanner is scanning horizontally.

Figure 4A:
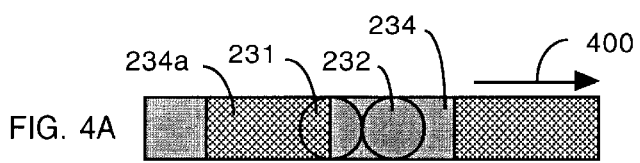
FIGS. 4A, 4B, 4C, 4D, 4E, 4F, 4G, 4H, and 4I show a sequence of the two modulated laser beams of FIG. 3 incident upon the facets of a rotating polygon.

To simplify the following discussion, the first line to be described will be assumed to be the first line in the display, a reference facet 234 is shown, and scanning begins on a first facet 234a. The first incident location will be assumed to be utilized by the first modulated beam 410, and the second incident location will be assumed to be utilized by the second modulated beam 420. In FIG. 4A, neither of the two incident locations have begun actively writing and therefore neither is illustrated as "active". Also in FIG. 4A, the first incident location falls upon the edge between the reference facet and the first facet. If writing the first beam were to begin in such a position, the first beam would be divided and reflected in two different direction directions, which is an undesirable result for this arrangement.

Figure 4B:
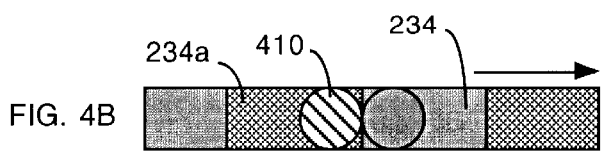
Figure 5A:
FIGS. 5A, 5B, 5C, 5D, 5E, 5F, 5H, and 5I show a scanning sequence of two modulated laser beams projected on a screen.
Figure 5B:

FIG. 4B shows an instant in time at which the first beam 410 commences to write the first line. In FIG. 4B, when the first incident location is substantially incident upon the first facet so that substantially all of the power of the first beam is reflected from the first facet, the first line starts to be written. FIG. 4B illustrates the first incident location as "active", which means that the first beam is actively writing. FIG. 5B, which corresponds to FIG. 4B, shows the first beam positioned on first edge of the screen, where it is beginning to write the first line.

Figure 4C:
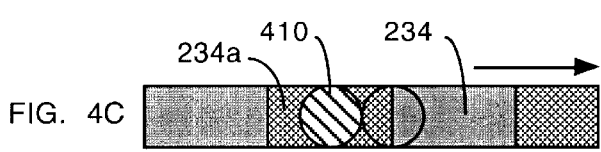
Figure 5C:
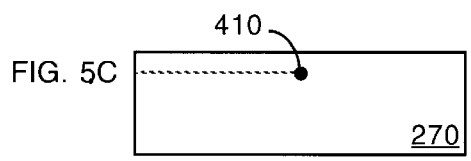

FIG. 4C shows the first incident beam midway through its cycle on the first facet with the first beam 410 actively writing, while the second incident location is situated on the edge between the reference facet and the first facet, and the second beam is not actively writing. The corresponding FIG. 5C shows the first beam midway across the screen writing the first line, and the second beam has not yet begun to write.

Figure 4D:
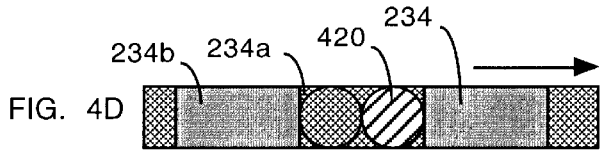
Figure 5D:
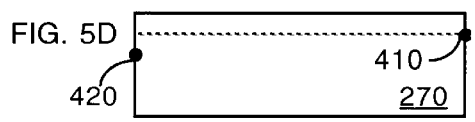

FIG. 4D shows the first incident location at the end of its cycle on the first facet 234a, and the first beam has just stopped writing; hence is not shown as "active". At the same time, the second incident location has become substantially incident upon the first facet 234a, and the second beam has just begun writing. The corresponding FIG. 5D shows the first beam 410 on the second edge of the screen having just completed writing the first line, while the second beam 420 is just beginning to write the second line.

The time interval between completing the first line and commencing to write the second line varies dependent upon the embodiment. In some embodiments, such as discussed with reference to FIGS. 9, 10, and 11, a single beam is switched between the first and second incident locations, and therefore in those embodiments the time interval must be at least sufficient to switch the single beam between the two incident locations. In other embodiments two separate beams are used such as disclosed with reference to FIG. 2, and therefore in such embodiments the time interval between completing the first line and commencing to write the second line may be small, or there may even be an overlap; i.e., the first beam may still be writing the first line at the time the second beam commences to write the second line.

Figure 4E:
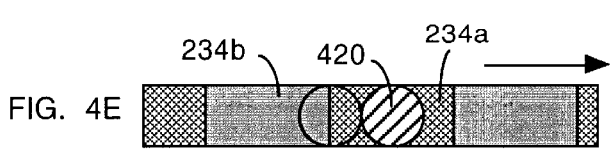
Figure 5E:
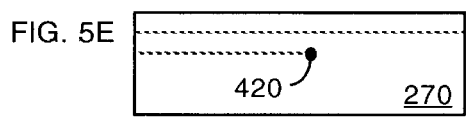

FIG. 4E shows the second incident location midway through its cycle on the first facet with the second beam 420 actively writing the second line 440, while the first incident location is situated on the edge between the first and second facets 234a and 234b. The first beam 410 is not writing. The corresponding FIG. 5E shows the second beam midway across the screen writing the second line.

Figure 4F:
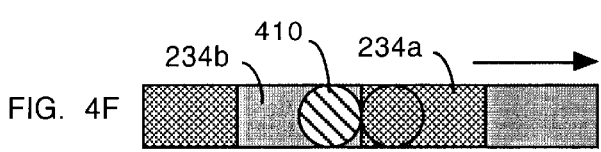
Figure 5F:
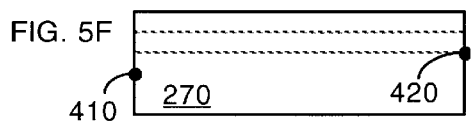

FIG. 4F shows the second incident location at the end of its cycle on the first facet, and the second 420 beam has just stopped writing the second line. At the same time, the first incident location has once again become substantially incident upon the second facet, and the first beam 410 commences to write the next line. The corresponding FIG. 5F shows the second beam on the second edge of the screen having just completed writing the first line, while the first beam is just beginning to write the third line.

Figure 4G:
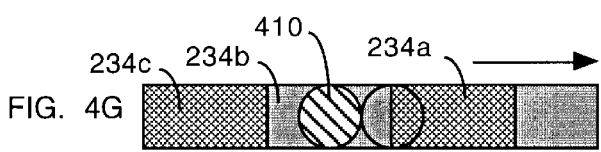
Figure 5G:
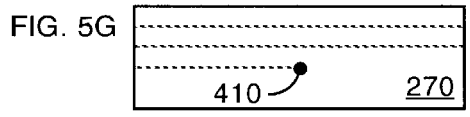

FIG. 4G shows the first beam 410 midway through its writing cycle on the second facet, while the second incident location is situated on the edge between the first facet and the second facet, and the second beam 420 is not writing. The corresponding FIG. 5G shows the first beam 410 midway across the screen writing the third line.

Figure 4H:
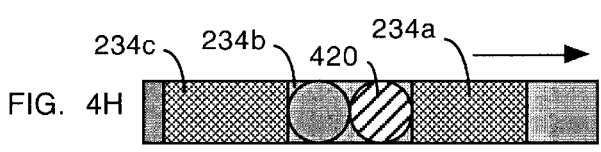
Figure 5H:
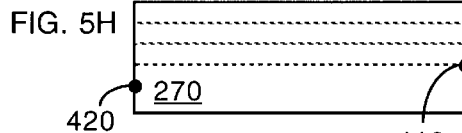

FIG. 4H shows the first incident location at the end of its cycle on the second facet. At the same time, the second incident location has become substantially incident upon the first facet, and the second beam 420 has just begun writing. The corresponding FIG. 5H shows the first beam 410 on the second edge of the screen having just completed writing the third line, while the second beam is just beginning to write the fourth line.

Figure 4I:
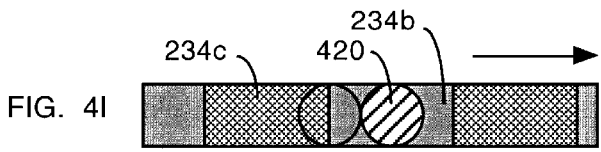
Figure 5I:
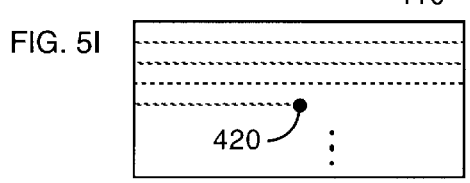

FIG. 4I shows the second incident location midway through its cycle on the second facet 234b with the second beam 420 actively writing. The first incident location is situated on the edge between the second facet 234b and the third facet 234c. The first beam is not writing. The corresponding FIG. 5I shows the second beam midway across the screen writing the second line.

Generally, FIGS. 4A–4I and 5A–5I show that scanning the beams in a two-beam embodiment across the screen follows a progressive scanning technique in which each beam scans every other line. The time interval required to scan each line is approximately equal, and furthermore, each subsequent scanning operation begins at time delayed from the beginning of the preceding line scanning operation by a uniform time interval. In other words, if a first time interval for scanning a first line begins at a time $t_1$, and a second time interval for scanning a second line begins at a time $t_2$, then the time elapsed between the first time $t_1$ and second time $t_2$ is an interval T that is approximately equal for all subsequent line scanning operations.

As will be described, the two-beam embodiment of FIGS. 4A–4I and 5A–5I can be expanded to accommodate additional pairs of beams. In other embodiments such as disclosed with reference to FIGS. 6, 7A–7I, 8A–8I, four or more beams (i.e. two or more pairs of beams) are used, and a progressive scanning technique scans each of the four or more beams in sequence, separated by a uniform time interval. In these embodiments, one or more additional pairs of beams could be used for any of a number of reasons such as increasing image resolution and/or reducing the bandwidth requirements of the modulators and scanners.

Figure 6:
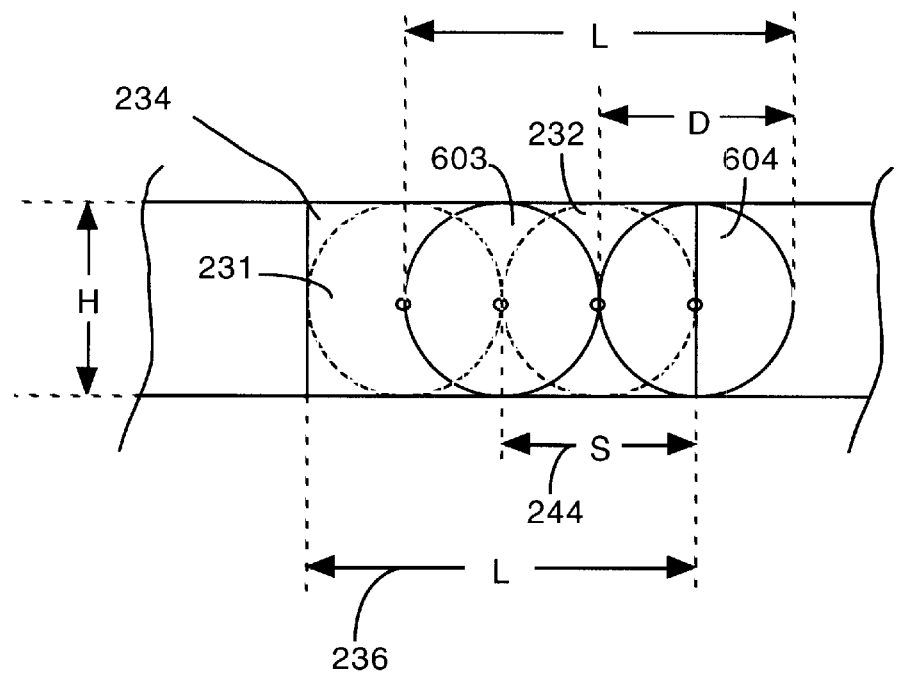
FIG. 6 is a plan view of a facet on the perimeter of the polygon mirror, showing four modulated laser beams situated on the facet.

Reference is now made to FIGS. 6, 7A–7I, and 8A–8I to illustrate a four-beam embodiment of a progressive scanning architecture. FIG. 6 is a plan view of the facets 234 of the polygon scanner, showing a first pair of incident locations that include the first and second incident locations 231 and 232 shown in FIG. 3, and a second pair of incident locations that include a third incident location 603 and a fourth incident location 604. The spacing between each of the pairs is approximately equal; i.e., the separation S between the first and second incident locations is separated by an approximately equal distance and the separation between the third and fourth incident locations is also approximately equal. Furthermore, the third incident location (the first beam of the second pair) is centered approximately at the midpoint between the first and second incident locations. The result of this spacing is that the first, second, third, and fourth incident locations are arranged in a row, spaced apart by approximately equal distances between adjacent beams.

Reference is now made to FIGS. 7A–7I and FIGS. 8A–8I. FIGS. 7A–7I are a series of plan views of several facets 234 of a rotating polygon scanner, showing the incident locations of two pairs of modulated laser beams as the polygon scanner rotates. The beams include a first pair comprising the first and second beams described with reference to FIGS. 3, 4A–4I and 5A–5I, and a second pair comprising a third beam 710 and a fourth beam 720 (i.e. the third beam is the first beam of the second pair, and the fourth beam is the second beam of the second pair). FIGS. 8A–8I show a portion of the screen and the beams' position provided by the configuration shown in the corresponding diagrams of FIGS. 7A–7I. FIGS. 8A–8I directly correspond to FIGS. 7A–7I; for example, FIG. 7A relates directly to FIG. 8A, and so forth.

In each of the FIGS. 7A–7I, the incident locations of the four beams remain at a fixed location while the facets 234 move in the direction shown by an arrow 700 due to rotation of the polygon. Each subsequent figure is separated by a fixed time interval; in other words, each subsequent figure shows the position of the facets with respect to the optical path at a next time interval. In FIGS. 7A–7I, if the incident beam is actively being written on the screen, then the active location is shown as cross-hatched; when an incident location is not being written it is shown in the outline of the incident location, which is approximated by a circle. Lines that have been scanned on the screen in FIGS. 8A–8I are indicated by dotted lines. Although FIGS. 7A–7I and 8A–8I do not show the vertical scanner, it should be apparent that the vertical scanner is scanning vertically while the polygon scanner is scanning horizontally.

The first line to be described will be assumed to be the first line in the display, beginning on the first facet 234a. In FIG. 7A, none of the four incident beams are yet actively writing and therefore none is illustrated as "active". Also, in FIG. 7A the first incident location falls upon the edge between the first facet 234a and the preceding facet.

FIG. 7B shows the first incident location (the first beam of the first pair) commencing to write the first line. In FIG. 7B, the first beam 410 at the first incident location becomes substantially incident upon the first facet 234a so that substantially all of the power of the first beam 410 is reflected from the first facet. FIG. 7B illustrates the first incident location as "active", which means that the first beam is actively writing. FIG. 8B, which corresponds to FIG. 7B, shows the first beam 410 positioned on first edge of the screen, where it is beginning to write the first line.

FIG. 7C shows the first beam 410 midway through its cycle on the first facet, and the third beam 710 at the third incident location (the first beam of the second pair) is now fully incident upon the first facet 234a. FIG. 8C shows the first beam about halfway through writing the first line, while the third beam positioned on first edge of the screen, beginning to write the second line. The second incident location (the second beam of the first pair), which is not yet writing, is situated on the edge between the first facet and the preceding facet.

FIG. 7D shows that the first beam 410 has just completed writing its line, with the first incident location at the end of its cycle. At the same time, the second incident location has now become substantially incident upon the first facet 234a, and the second beam 420 has just begun writing. The corresponding FIG. 8D shows the first beam 410 on the second edge of the screen having just completed writing the first line, the third beam 710 approximately halfway across the screen writing the second line, while the second beam 420 is just beginning to write the third line.

For most embodiments, the spacing between adjacent incident locations on the facet is approximately equal, the time interval between commencing to write each subsequent line is approximately equal, and the rate of vertical scanning is approximately constant, which causes the line spacing on the screen (i.e. the distance between each line) to be approximately equal.

FIGS. 7E and 8E show the third beam 710 (the first beam of the second pair) at the third incident location having just completed scanning the second line, while the second beam 420 is approximately halfway through its cycle scanning the third line, and the fourth beam 720 is just beginning to write the fourth line.

FIGS. 7F and 8F show the second beam 420 at the end of its cycle on the first facet 234a having completed writing the third line, and the fourth beam 720 about halfway through writing the fourth line. Meanwhile, the first beam 410 at the first incident location has now become substantially incident upon the second facet 234b. Accordingly, the first beam 410 has again become active and is beginning to write the fifth line.

FIGS. 7G and 8G show the first beam 410 midway through its cycle on the second facet 234b writing the fifth line, while the third beam 710 has just become fully incident upon the second facet 234b, and is beginning to write the sixth line. The fourth beam 720 has just completed writing the fourth line.

FIGS. 7H and 8H show the first beam 410 at the end of its cycle on the second facet 234b, having completed writing the fifth line. The third beam 710 is about halfway through its cycle writing the sixth line. The second beam 420 has just become substantially incident upon the second facet 234b, is beginning to write the seventh line.

FIG. 7I shows the third beam 710 at the end of its cycle on the second facet 234b, having completed writing the sixth line. The second beam 420 is about halfway through its cycle writing the seventh line. The fourth beam 720 has now become substantially incident upon the second facet, and is beginning to write the eighth line.

FIGS. 6, 7A–7I and 8A–8I show two pairs of modulated beams (i.e. four incident locations and four modulated beams). In other embodiments additional pairs of incident locations could be added in accordance with the principles disclosed herein. Generally, incident locations are arranged in a row, the centers of the two beams in each pair are separated by an approximately equal distance, and the distance between adjacent incident locations is approximately uniform along the entire row. Also, the angles of incidence of beams at adjacent locations are separated by approximately equal angles. The spacing between pairs depends upon the number of pairs; generally, the pairs are arranged so that the incident locations are separated by an approximately equal distance, which causes the lines on the screen to be approximately evenly spaced due to the constant vertical scan. For example, in an eight-beam embodiment, the first beams in each of the pairs are separated by a distance of about one-fourth of the separation S (FIGS. 3, 6) between the two beams in a pair. As a result, the first beam from the first pair begins scanning the first line, then after a time interval the first beam from the second pair begins scanning the second line, then after an approximately equal time interval the first beam from the third pair begins scanning the third line, and so forth until all of the first beams have begun scanning. When the first beam from the first pair has completed scanning the first line, then the second beam from the first pair begins scanning the next line, then the second beam from the second pair begins scanning the following line, and so forth. While scanning, at least two beams are scanning separate lines on the screen, staggered by an approximately equal phase delay. If the spacing between adjacent incident locations and angles of incidence on the facet are approximately equal, the time interval between commencing to write each subsequent line is approximately equal, and the rate of vertical scanning is approximately constant, the resulting line spacing on the screen (i.e. the distance between each line) will be approximately equal, which is a useful result, insofar as it creates an interlaced progressive scan architecture.

Switched Embodiments

FIG. 2, previously discussed, shows two laser beams that are independently-modulated by two modulators to provide two beams that propagate along two optical paths (which are separated by an appropriate angle) to the polygon scanner. In alternative embodiments to be described with reference to FIG. 9, for example, the two modulators are replaced with a single modulator and a switching system that switches the single modulated beam between the first and second optical paths, thereby utilizing a single beam and single modulator and switching the beam between the two paths to provide two modulated beams for each pair. In these embodiments, the scanning architecture is such that no more than one beam from each pair is being written on screen at any one time. The switching system switches the modulated beam between the first and second incident locations of each pair, dependent upon which beam is being written. For convenience of description, the modulated beam directed to the first incident location may be termed the first modulated beam and the modulated beam directed to the second incident location may be termed the second modulated beam. Such a system more efficiently utilizes laser power and reduces equipment cost. Particularly in such a system, the number of modulators can be reduced by about one-half, the beam power requirements are reduced by about one-half, all of which can result in significant cost savings at the relatively small cost of additional optical elements.

Reference is now made to FIG. 9, which is a block diagram of an alternative embodiment to generate first and second modulated laser beams for a single pair of incident locations. An unmodulated, but polarized, laser beam 202 is applied to an acousto-optic (AO) modulator 910. An AO modulator operates by deflecting a laser beam responsive to a modulated signal. Responsive to video signal 915 (described with reference to FIG. 1, for example), the AO modulator 910 produces an undeflected beam 920 and an amplitude-modulated (deflected) beam 925. The undeflected beam 920 is directed to a beam dump 928 where it is discarded. The amplitude-modulated beam 925, which is substantially polarized in a predetermined direction, is provided to an electro-optic modulator 930 and a polarization-dependent beamsplitter 935, which switches the beam 925 responsive to a switch signal 937 to provide either a first amplitude-modulated beam 940 or a second amplitude-modulated laser beam 945. The electro-optic modulator 930 operates by switching the polarization of the modulated beam responsive to the video signal so that the appropriate first or second optical path is selected by the polarization dependent beamsplitter 935. Other embodiments could utilize other switching systems. The first and second amplitude-modulated laser beams are then directed to the polygon scanner by appropriate optics; thereby defining the first and second beams of a pair.

Generally, the switching signal 937 alternately selects the first or the second modulated beam in a pair to write sequential lines, in manner such as disclosed with reference to FIGS. 3, 4A–4I, and 5A–5I, or to FIGS. 6, 7A–7I, and 8A–8I. The switch signal 937 selects the first modulated laser beam while its line is being written, and after completion of that line, the switch signal 937 selects the second modulated beam, which subsequently writes its respective line. The switch signal 937 is generated by any appropriate system; for example the position of the polygon scanner could be utilized to determine the appropriate switch time. Alternatively, the system that generates the video signal could provide the switch signal, responsive to completion of writing a line.

RGB Embodiments

Figure 10:
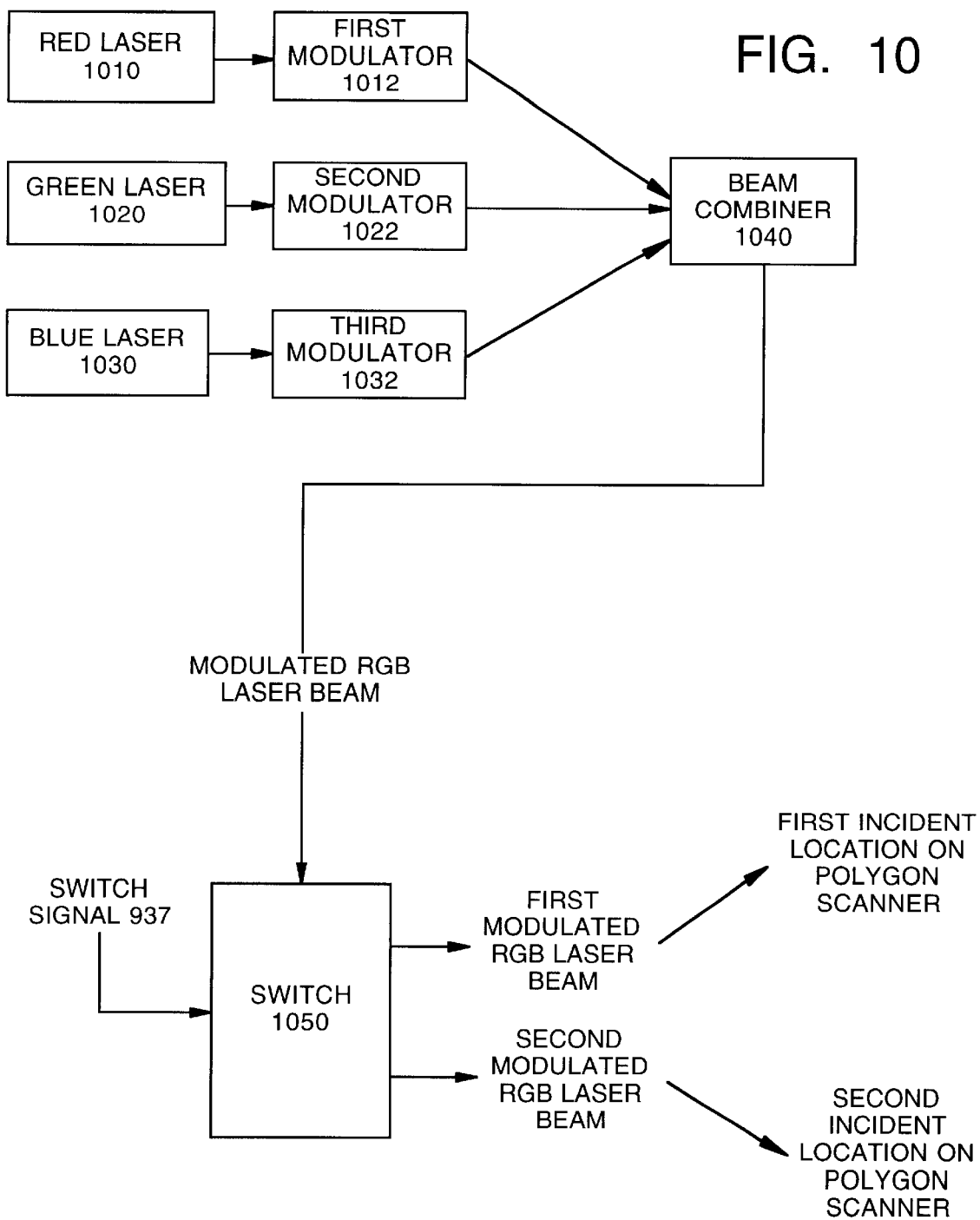
FIG. 10 is a block diagram of a laser system that combines a modulated red, green, and blue laser beam to generate a modulated RGB laser beam and a switch that is used to provide a first and a second modulated RGB laser beam for a full-color display.

Reference is now made to FIG. 10, which is a block diagram of one embodiment of a system that generates a pair of full-color modulated beams. A suitable red laser 1010 supplies a red beam to a first modulator 1012, a green laser 1020 supplies a green beam to a second modulator 1022, and a blue laser 1030 supplies a blue beam to a third modulator 1032. Any suitable lasers and modulators can be utilized. For example, in one embodiment the red laser is a semiconductor laser, the green and blue lasers are diode-pumped solid state lasers, and the first, second, and third modulators comprise acousto-optic or electro-optic modulators.

The modulated red, green, and blue beams from the first, second and third modulators are combined in a suitable beam combiner 1040 to provide a single modulated RGB laser beam. The beam combiner may comprise a set of dichroic mirrors, an "x" beam combiner, or other suitable optics.

The modulated RGB laser beam from the combiner 1040 is switched by a switch 1050 such as an electro-optic element to provide one of a first modulated RGB laser beam and a second modulated RGB laser beam, which correspond to a pair of beams such as those discussed above with reference to FIGS. 3 and 6, for example. Particularly, the first and second beams are directed by appropriate optics to the first and second incident locations of a single pair on the perimeter of the polygon scanner.

As in the embodiment disclosed in FIG. 9, the switch signal 937 controls the switch 1050 to select the first modulated RGB laser beam while its line is being written, and after completion of that line, the switch signal 937 selects the second modulated beam, which subsequently writes its respective line. Generally, the switching signal 937 alternately selects the first or the second modulated beam in a pair to write the respective line, in a manner such as disclosed with reference to FIGS. 3, 4A–4I, and 5A–5I, or to FIGS. 6, 7A–7I, and 8A–8I.

Figure 11:
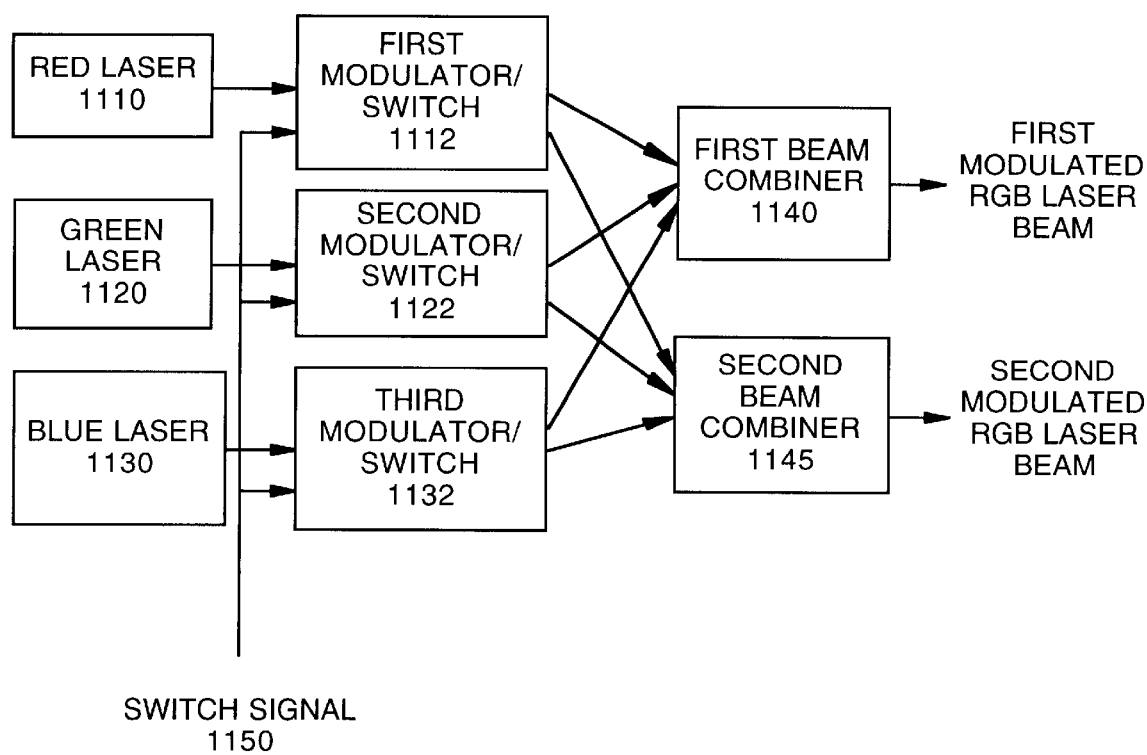
FIG. 11 is a block diagram of an embodiment including a first, a second, and a third modulator/switch configuration to modulate and switch optical radiation from a red, green, and blue laser and create a first modulated RGB laser beam and a second modulated RGB laser beam.

Reference is now made to FIG. 11, which is a block diagram of an alternative embodiment of a system that generates a full color modulated beam. A suitable red laser 1110 supplies a red beam, a suitable green laser 1120 supplies a green beam, and a blue laser 1130 supplies a blue beam. Any suitable lasers can be utilized; for example in one embodiment the red laser is a semiconductor laser, and the green and blue lasers are diode-pumped solid state lasers.

The red beam is supplied to a first modulator/switch 1112, the green beam is supplied to a second modulator/switch 1122, and the blue beam is supplied to a third modulator/switch 1132. One example of a suitable modulator/switch is disclosed with reference to FIG. 9, in which the deflected beam of an acousto-optic modulator is switched between two discrete output beam angles; thereby providing the first and second modulated beams.

The first, second and third modulator/switches are configured so that the first modulated beams from each of the modulator/switches are directed to a first beam combiner 1140 and the second modulated beams from each of the modulator/switches are directed to a second beam combiner 1145. The first and second modulated RGB laser beams provide a pair of beams such as disclosed with reference to FIGS. 3 and 6 that are directed by appropriate optics to the first and second incident locations of a single pair on the perimeter of the polygon scanner.

A switch signal 1150 controls the first, second, and third modulator/switches 1112, 1122, and 1132 to select the first modulated red, green, and blue laser beams, or the second modulated red, green, and blue laser beams. Generally, the switching signal 1150 alternately selects the first or the second modulated beam in a pair as appropriate to write the respective line, in a manner such as disclosed with reference to FIGS. 3, 4A–4I, and 5A–5I, or to FIGS. 6, 7A–7I, and 8A–8I.

Example of an Embodiment of a High Resolution Display

The invention described herein can be implemented in many different configurations. One particular example is a 2000×1000 pixel display in which each pixel must be refreshed at a 60 Hz rate. During the course of each frame, 1000 sequential lines are written progressively, each line being modulated to generate 2000 resolvable pixels. Neglecting the need for flyback and retrace intervals for the purpose of illustration, this rate of line initiation requires that a new line be commenced every 16.7 microseconds. It is of note that such a system requires a video bandwidth approximately twice that of interlaced HDTV (1920×1080).

For purposes of comparison, using a single-beam to generate 2000 pixels within a 16.7 microsecond time interval theoretically requires a modulation bandwidth of 120 MHz. However, when a polygon mirror/galvanometer is used to generate the horizontal/vertical scan format, the practical limitations imposed both upon polygon scanner size and upon flyback and retrace intervals are such as to reduce the effective duty cycle of the scan architecture to approximately one-half. Consequently, a practical single-beam architecture for a 2000×1000 pixel display would require a line-writing time of about 8.3 microseconds; the corresponding modulation bandwidth being on the order of 240 MHz. Unfortunately, a practical modulator that can provide a bandwidth of this magnitude is not available. Even acousto-optic modulators, which come closest to satisfying such a requirement using current technology, are limited to bandwidths in the 60 MHz regime.

By scanning multiple beams using the progressive scan architecture described herein these requirements can be met in an embodiment that uses acousto-optic modulators. A single beam scanning system is not feasible because the 60 MHz bandwidth limitation of acousto-optic modulators does not allow a 2000 pixel line to be refreshed in a period of 8.3 microseconds, but rather, requires 33.3 microseconds. To use a line refresh time of 33.3 microseconds requires that the number of beams be increased by a factor of four (i.e. from one to four) while the scan rate is slowed by the same factor, which advantageously allows the use of lower speed polygons. Consistent with using acousto optic modulators to provide a 2000×1000 format, this embodiment uses four beams such as described with reference to FIGS. 6, 7A–7I, and 8A–8I. Each of the four beams can be modulated at 60 MHz; i.e. at one quarter of the collective bandwidth. Meanwhile, the progressive nature of the scan is preserved by arranging for each new line to be commenced while one or more previous lines are still in the process of being written. In one embodiment, the times at which successive lines are commenced are equally spaced.

In other embodiments, resolutions in excess of this 2000× 1000 example can be achieved simply by increasing the number of beam pairs. Assuming a fixed limit to the modulation bandwidth of available acousto optic modulators, the required increase in the number of modulators is directly proportional to the number of pixels in the image. Meanwhile, the rotational speed of the scanning polygon typically decreases inversely as the square root of the number of pixels in the image. More specifically, its speed decreases inversely as the number of pixels contained in each horizontal line. For example, consider two imaging systems which must refresh each pixel at a 60 Hz rate; one system having a resolution of 2000×1000 pixels, the other having a resolution of 4000×2000 pixels. The higher resolution system requires theoretically that pixels are written at a 480 MHz rate; thereby requiring the use of eight 60 MHz acousto optic modulators. The corresponding pixel writing rate of the lower resolution system is 120 MHz; requiring that two modulators be used. Hence, the number of modulators required is reduced in direct proportion to the number of pixels in the image. Meanwhile, assuming for both cases a 50 percent duty cycle for each beam location, the low and high resolution systems require polygon scanner speeds corresponding to 15,000 facets per second and 7,500 facets per second, respectively. For example, if the polygon has 24 facets, the corresponding rotation speeds become 37,500 RPM and 18,750 RPM, respectively. Hence, while the number of pixels has been increased by a factor of four, the rotational speed of the polygon has been decreased by a factor of two; i.e. as the inverse square root of the number of pixels.

Figure 12:
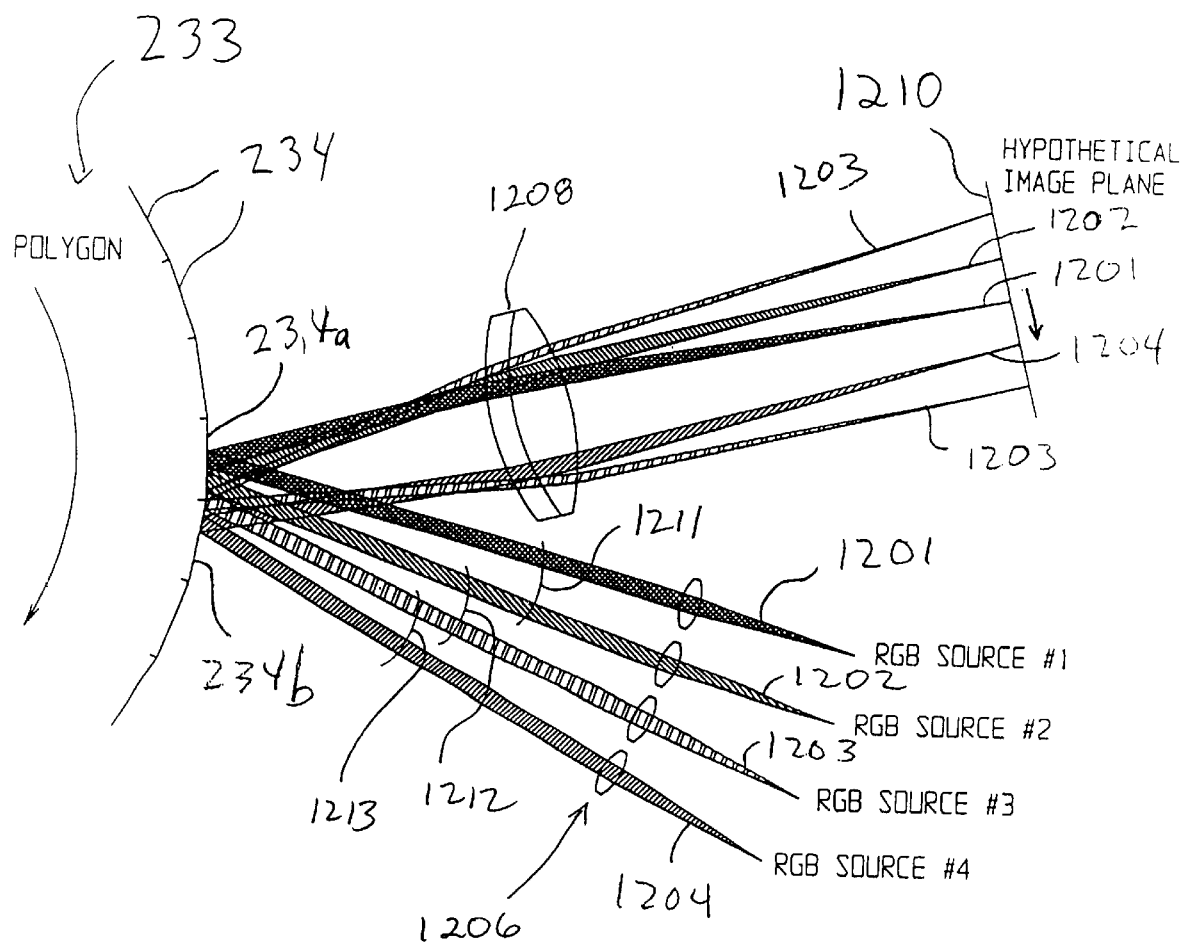
FIG. 12 is a top view of a rotating polygon scanner 233 with four modulated RGB beams incident thereon, and FIG. 13 a schematic view of a hypothetical image plane defined between a first outer boundary 1301 and a second outer boundary 1302, a central image region defined within the hypothetical image plane, and a plurality of lines scanned therein.

Reference is now made to FIG. 12, which is a top view of a rotating polygon scanner 233 with four modulated RGB beams incident thereon, including a first modulated RGB beam 1201, a second modulated RGB beam 1202, a third modulated RGB beam 1203, and a fourth modulated RGB beam 1204 that are propagated through an optical system shown generally at 206 to the polygon scanner, reflected from facets 234 of the polygon scanner, and then projected via a projection system 1208 onto a hypothetical image plane 1210. To correlate FIG. 12 with FIGS. 6, 7A–7I, and 8A–8I, it may be useful to note that in FIG. 12 a first pair of beams are defined by the first and third beams 1201, 1203, and a second pair of beams are defined by the second and fourth beams 1202, 1204, whereas in FIGS. 7A–7I and 8A–8I, a first pair of beams is defined by first and second beams 410 and 420 and a second pair of beams is defined by the third and fourth beams 710 and 720.

Implementation of the progressive scanning architecture as described herein takes advantage of the multi-faceted nature of the polygon scanner. In particular, it takes advantage of the fact that, in contrast to galvanometric scanners, there is no unique phase associated with a polygon scanner. This feature permits a multiplicity of beams to be scanned simultaneously, but to exhibit phase angles that differ from beam to beam. FIG. 12 illustrates four beams being simultaneously scanned in a progressive multi-phase, fashion. For the instant illustrated, the first beam 1201 falls upon the center of the first polygon facet 234*a*. As such, the first beam 1201 is shown as it traverses the center of the final image. Since this location represents the mid-point of the scan, the first beam 1201 can be said to have a phase angle of 180° at this instant in time. Meanwhile, the third beam 1203 falls at the intersection of the first facet 234*a* and an adjacent facet 234*b*, falling approximately equally on each. Hence, the third beam 1203 can be described as having a phase angle of either 0° or 360° at this instant in time.

Figure 13:
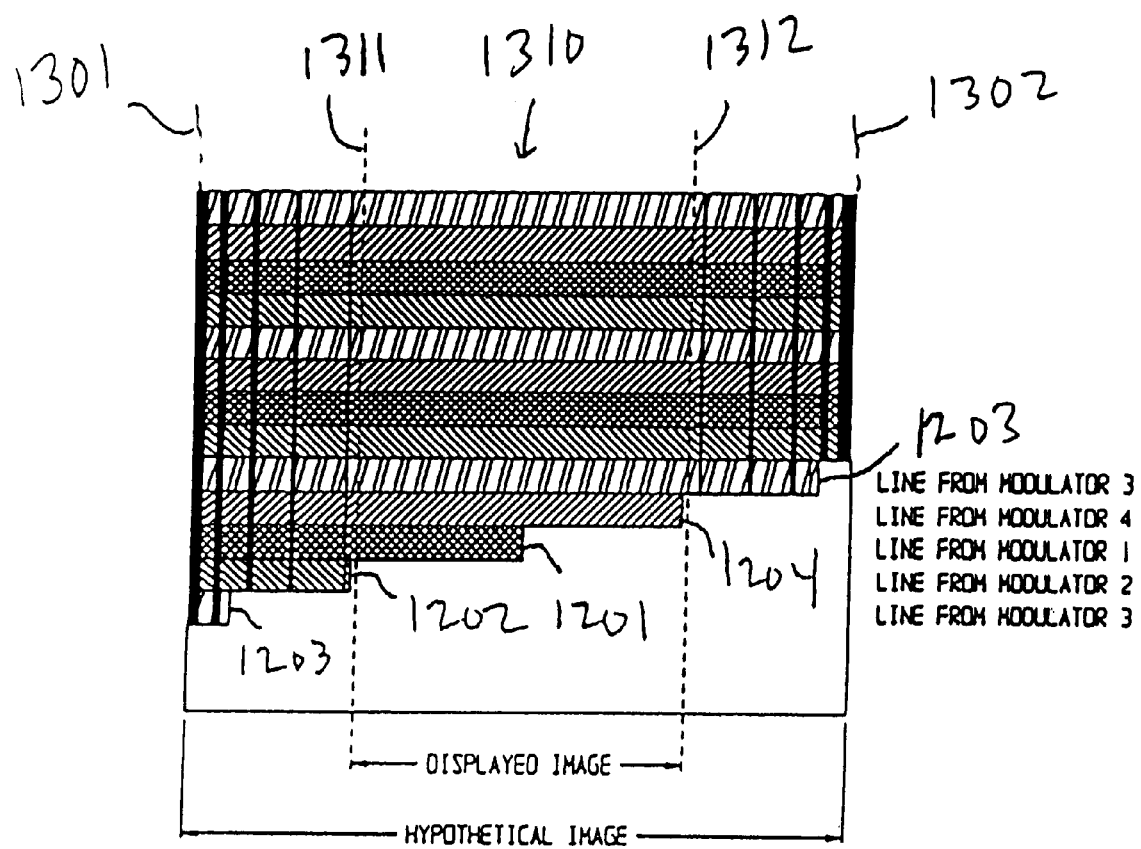

Note that, since the footprint of the third beam is divided between two facets, half of the reflected beam is directed toward one extreme end of the hypothetical image 1210, while the other half is directed toward the opposite end; these locations corresponding to the 0° or 360° points of such an image. The term "hypothetical" is used to reference the image plane illustrated, but the practical, usable width of the image does not extend to these extremes. The scanner duty cycle has an upper limit of (L−D)/L, where D is the diameter of the beam footprint and L is the length of a polygon facet. FIG. 13 shows the smaller region of the displayed image within the wider region of the hypothetical image.

Consistent with use of a phase angle to describe the instantaneous status of a scanning beam, the second beam 1202 and the fourth beam 1204 exhibit phase angles of 90° and 270°, respectively; which are mid-way between the phase angles of the first and third beams. For the four-beam configuration shown in FIG. 12, the physical angles subtended between adjacent beams prior to their becoming incident upon the polygon are one-quarter of the angle subtended by the full width of the hypothetical image. Particularly, a first angle 1211 subtended between the first and second beams 1201, 1202 is approximately equal to a second angle 1212 subtended between the second and third beams 1202, 1203, which is approximately equal to a third angle 1213 subtended between the third and fourth beams 1203 and 1204. Hence, at any instant in time, the four beams are staggered in an equally-paced manner as they approach the image plane, which facilitates implementation of the multi-beam geometry, in that the multiple inputs are separated uniformly in space.

Reference is now made to FIG. 13, which is a schematic view of the hypothetical image plane 1210 defined between a first outer boundary 1301 and a second outer boundary 1302. FIG. 13 shows a series of scanned lines, including the first, second, third, and fourth beams that are being scanned. In FIG. 13, the scan sequence is frozen at a time that corresponds to the beam phases depicted in FIG. 12. The hypothetical image plane 1210 includes a displayed image in a central region 1310 between a first image boundary 1311 and a second image boundary 1312. The first beam 1201 lies at the mid-point of a line scan, the second beam 1202 is at the first image boundary beginning its scan, the fourth beam is at the second image boundary completing its scan, while the third beam contributes 50% of its power to each of the two regions outside the central region 1310 but still within the hypothetical image plane 1210 (i.e., the regions to left and right of the central (image) region. Generally, the first, second, third, and fourth beams 1201, 1202, 1203, and 1204 traverse the image sequentially so as to develop the image in a progressive fashion.

In conventional single-beam systems the fractional image width of the central region, which constitutes the real image, can be as high as 70–80 percent; this fraction being made as high as possible so as to maximize the efficiency, or duty cycle, of the system. However, for multi-beam progressively-scanned systems such as described herein that have an even number of beams, a fractional scan that is slightly less than 50 percent can be advantageous in some embodiments. Consistent with such an arrangement, no more than half of the beams are in use at any one time. Referring to FIG. 12, for example, consistent with a duty cycle of about 50%, the second beam is just commencing a scan while the fourth beam has just completed a scan. Thus, by making the duty cycle slightly less than 50%, it becomes possible to alternate laser input power between the second and fourth beams as shown in FIG. 9, for example, so as to halve the laser power required to achieve any specified image brightness. Likewise, the input power to the first and third beams can be provided on an alternating basis. This feature if implemented in the progressive scanning architecture greatly increases overall system efficiency in comparison to the efficiency achievable with a single-beam system. Also, if the switching of laser power is effected downstream of the modulators, the number of modulators can be reduced by a factor of two. In embodiments in which the modulator is an acousto-optic modulator, different drive frequencies can be used to switch between different output ports, and thereby a single device can provide both switching and modulation. Other embodiments are disclosed with reference to FIGS. 9, 10, and 11.

In summary, the progressive scanning architecture described herein can be implemented to advantageously provide near-zero latency while producing images of extremely high resolution. Also, by virtue of its progressively scanned nature, the resulting images can be substantially free from the psycho-visual artifacts that accompany other multi-beam scan architectures. In further contrast to other multi-beam architectures, the adoption of a scan duty cycle of slightly less than 50% in some embodiments enables the laser duty cycle to approach 100%, while at the same time halving the required number of modulators. A reduced scan duty cycle has the added benefit of reducing the facet length, and hence the diameter, of the polygon. Finally, the progressive scanning architecture can be implemented in a straightforward fashion without using either an ultra-high speed horizontally scanning polygon or an extremely linear vertically scanning galvanometer.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A progressive scanning system for scanning a plurality of laser beams to generate a two-dimensional image, comprising:

first scanning means for scanning a first and a second laser beam along a first axis of said two-dimensional image, said scanning means including a rotating polygon mirror arranged to alternately scan said first and second modulated laser beams; and second scanning means for scanning said first and second laser beams at an approximately constant rate along a second axis that is substantially perpendicular to said first axis of said two-dimensional image.

2. The progressive scanning system of claim 1 wherein:

said first laser beam comprises an RGB beam that includes a modulated red beam, a modulated green beam, and a modulated blue beam; and said second laser beam comprises a second RGB beam that includes a modulated red beam, a modulated green beam and a modulated blue beam.

3. The progressive scanning system of claim 1 wherein said first and second laser beams define a first pair, and further comprising a second pair of laser beams including a third laser beam and a fourth laser beam alternately scanned by said first and second scanning means.

4. The progressive scanning system of claim 1 and further comprising:

a first optical system arranged to propagate the first laser beam along a first optical path to said rotating polygon mirror; and a second optical system arranged to propagate the second laser beam to said rotating polygon mirror along a second optical path non-parallel to said first optical path.

5. The progressive scanning system of claim 4 further comprising:
a laser source that generates a beam of laser radiation;
a modulator arranged to modulate said beam of laser radiation and thereby generate a modulated beam;
an optical switch that switches said modulated beam between the first and second optical paths so that said modulated beam provides said first beam when switched to said first optical path and said modulated beam provides said second beam when switched to said second optical path.

6. The progressive, scanning system of claim 1 wherein said first scanning means further comprises a polygon scanner having a perimeter and a plurality of reflective facets formed on said perimeter, each of said facets having an approximately equal length, said polygon scanner arranged so that said first laser beam has a first incident location on said perimeter and said second laser beam has a second incident location on said perimeter, said first and second incident locations arranged in a row aligned with said perimeter.

7. The progressive scanning system of claim 6 where in said second scanning means further comprises a scanning mirror arranged to receive said first and second beams from said polygon scanner, said scanning mirror and said polygon scanner cooperating such that said first laser beam scans a first line in said image and said second laser beam scans a second line delayed from said first line.

8. The progressive scanning system of claim 6 wherein said first and second beams have approximately equal diameter at said perimeter, said facets have a length approximately equal to two of said beam diameters and said first and second incident locations have a center-to-center distance of approximately one-half of said facet length.

9. The progressive scanning system of claim 1 further comprising:
a laser source for generating said plurality of laser beams; and
means for modulating said plurality of laser beams.

10. The progressive scanning system of claim 9 wherein said means for modulating said plurality of laser beams comprises:
a source of image data;
a video processor that receives said image data;
a modulator driver coupled to receive the output of said video processor; and
a light modulator coupled to said modulator driver.

11. The progressive scanning system of claim 1 further comprising:
a screen for viewing said image; and
an image projection system for projecting said image onto said screen.

12. A method for progressively scanning a plurality of laser beams to generate a two-dimensional image, comprising:
alternately scanning a first and a second laser beam along a first axis of said two-dimensional image; and
scanning said first and second laser beams at an approximately constant rate along a second axis that is substantially perpendicular to said first axis of said two-dimensional image.

13. The progressive scanning method of claim 12 further comprising alternately scanning a third and a fourth laser beams with said first and second laser beams.

14. The progressive scanning method of claim 12 wherein said step of alternately scanning said first and second laser beams includes rotating a polygon mirror that is arranged to receive said first laser beam along a first optical path and also arranged to receive said second laser beam along a second optical path non-parallel to said first optical path, said first and second laser beams defining a row along a perimeter of said polygon mirror.

15. The progressive scanning method of claim 12 further comprising:
generating a beam of laser radiation;
modulating said beam of laser radiation to generate a modulated laser beam;
switching said modulated beam so that said modulated beam provides said first beam when switched to a first optical path and said modulated beam provides said second beam when switched to a second optical path.

16. The progressive scanning method of claim 12, further comprising:
modulating a red laser beam, a green laser beam, and a blue laser beam;
combining said red, green, and blue beams to form a first RGB beam that defines said first laser beam;
modulating a second red laser beam, a second green laser beam, and a second blue laser beam;
combining said second red, green, and blue beams to form a second RGB beam that defines said second laser beam; and
alternately scanning said first and second RGB beams to provide a full color image.

17. The progressive scanning method of claim 12 further comprising:
generating said plurality of laser beams; and
modulating said plurality of laser beams.

18. The progressive scanning method of claim 12 further comprising projecting said image.

19. A progressive scanning system for scanning at least a first and a second modulated laser beam to generate a two-dimensional image, comprising:
a first optical system arranged to propagate the first modulated laser beam along a first optical path;
a second optical system arranged to propagate the second modulated laser beam along a second optical path non-parallel to said first optical path;
a polygon scanner having a perimeter and a plurality of reflective facets formed on said perimeter, each of said facets having an approximately equal length, said polygon scanner arranged so that said first optical path has a first incident location on said perimeter and said second optical path has a second incident location on said perimeter, said first and second incident locations arranged in a row aligned with said perimeter; and
a scanning mirror arranged to receive said first and second beams from said polygon scanner, said scanning mirror and said polygon scanner cooperating so that said polygon scanner scans the image along a first axis of said two-dimensional image and said scanning mirror scans along a second axis substantially perpendicular to said first axis such that said first modulated laser beam scans a first line in said image and said second modulated laser beam scans a second line delayed from said first line.

20. The progressive scanning system of claim 19 wherein said scanning mirror includes a motive system that scans said scanning mirror along said second axis at an approximately constant rate.

21. The progressive scanning system of claim 19 wherein said first and second incident locations have a center-to-center distance of approximately one-half of said facet length.

22. The progressive scanning system of claim 21 wherein said facets have a length approximately equal to two beam diameters.

23. The progressive scanning system of claim 19 further comprising:
   a laser source that generates a beam of laser radiation;
   a modulator arranged to modulate said beam of laser radiation and thereby generate a modulated beam;
   an optical switch that switches said modulated beam between the first and second optical paths so that said modulated beam provides said first modulated beam when switched to said first optical path and said modulated beam provides said second modulated beam when switched to said second optical path.

24. The progressive scanning system of claim 19 wherein said first and second laser beams define a first pair of laser beams, and further comprising:
   a second pair of laser beams including a third laser beam that is directed by a third optical path to a third incident location and a fourth laser beam that is directed by a fourth optical path to a fourth incident location;
   wherein said first, second, third, and fourth incident locations are arranged in a row having a sequence defined by the first, third, second, and fourth incident locations, with a substantially equal spatial separation between adjacent incident locations; and
   wherein said laser beams propagate at an approximately equal angular separation between adjacent beams, so that an approximately equal angle is provided between said first and third beams, between said third and second beams, and between said second and fourth beams.

25. The progressive scanning system of claim 19 wherein said first modulated laser beam comprises a first RGB combined laser beam, and said second modulated laser beam comprises a second RGB combined laser beam.

26. A method for progressively scanning an image defined by data arranged in a plurality of rows that correspond to a plurality of lines in the image, comprising:
   a) modulating a first laser beam with a first row of image data, propagating said modulated laser beam along a first optical path, and scanning said first modulated laser beam with a polygon scanner to display a first image line during a first time interval that begins at a first time;
   b) during a second time interval that begins at a second time delayed from the first time by a uniform time interval, modulating a second laser beam with a second row of image data, propagating said modulated laser beam along a second optical path non-parallel with said first optical path, and scanning said second modulated laser beam with the polygon scanner to display a second image line during a second time interval;
   c) alternately performing said steps a) and b) to display each subsequent row of image data thereby displaying said plurality of lines in said image, each subsequent line scanning operation beginning at a time delayed from the beginning of the preceding line scanning operation by said uniform time interval.

27. The method of claim 26 further comprising:
continuously scanning said first and second modulated laser beams approximately perpendicular to said image lines throughout said first, second, and subsequent line scanning intervals.

28. The method of claim 26 further comprising:
modulating said first laser beam in a first light modulator during said first time interval to provide said first modulated laser beam; and
modulating said second laser beam in a second light modulator during said second time interval to provide said second modulated laser beam.

29. The method of claim 26 further comprising:
modulating a green laser beam, a red laser beam, and a blue laser beam;
combining said green, red, and blue laser beams to form an RGB beam, said RGB beam that defines said first laser beam;
modulating a second green laser beam, a second red laser beam, and a second blue laser beam;
combining said second green, red, and blue laser beams to form a second RGB beam that defines second laser beam.

30. The method of claim 26 further comprising:
modulating said first laser beam in a light modulator during said first time interval to provide said first modulated laser beam;
switching said first modulated laser beam from said first optical path to said second optical path after said first time interval;
modulating said second laser beam in said light modulator during said second time interval to provide said second modulated laser beam; and
switching said second modulated laser beam from said second optical path to said first optical path after said second time interval.

31. The method of claim 26 further comprising:
during a third time that begins at a third time delayed from the first time by an approximately uniform time interval, modulating a laser beam with a third row of image data, propagating said modulated laser beam along a third optical path arranged non-parallel with said first and second optical paths, and scanning said third modulated laser beam with a polygon scanner to display a third image line; and
during a fourth time interval that begins at a fourth time delayed from the second time by an approximately uniform time interval, modulating a laser beam with a fourth row of image data, propagating said modulated laser beam along a fourth optical path arranged non-parallel with said first, second, and third optical paths, and scanning said fourth modulated laser beam with the polygon scanner to display a fourth image line.

* * * * *